United States Patent [19]
Kirchhoffer et al.

[11] Patent Number: 5,722,519
[45] Date of Patent: Mar. 3, 1998

[54] MULTIPLE RATIO AUTOMATIC TRANSMISSION AND TORQUE CONVERTER

[75] Inventors: Johann Kirchhoffer, Cologne; Thomas Martin, Puhlheim; Eric Reichert, Leverkusen; Werner Croonen, Bergheim; Thomas Wagner, Cologne; Wolfgang Wickler, Bruhl, all of Germany

[73] Assignee: Ford Global Technologies, Inc., Dearborn, Mich.

[21] Appl. No.: 659,992

[22] Filed: Jun. 7, 1996

Related U.S. Application Data

[60] Continuation-in-part of Ser. No. 526,457, Sep. 11, 1995, Pat. No. 5,553,694, which is a division of Ser. No. 323,464, Oct. 14, 1994.

[51] Int. Cl.$^6$ .................................................. B60K 41/04
[52] U.S. Cl. ........................ 192/3.3; 364/424.1; 477/62
[58] Field of Search ........................... 192/3.3, 3.29, 192/3.25, 3.58; 477/62, 65, 53; 364/424.1

[56] References Cited

U.S. PATENT DOCUMENTS

| | | | |
|---|---|---|---|
| 4,468,988 | 9/1984 | Hiramatsu | 74/868 |
| 4,706,790 | 11/1987 | Lockhart et al. | 192/3.3 |
| 4,725,951 | 2/1988 | Niikura | 364/424.1 |
| 5,029,087 | 7/1991 | Cowan et al. | 364/424.1 |
| 5,081,886 | 1/1992 | Person et al. | 74/866 |
| 5,121,820 | 6/1992 | Brown et al. | 192/3.3 |
| 5,123,302 | 6/1992 | Brown et al. | 74/866 |
| 5,150,297 | 9/1992 | Daubermier et al. | 364/424.1 |
| 5,157,608 | 10/1992 | Sankpal et al. | 364/424.1 |
| 5,272,630 | 12/1993 | Brown et al. | 364/424.1 |
| 5,303,616 | 4/1994 | Palansky et al. | 74/890 |
| 5,305,663 | 4/1994 | Leonard et al. | 74/866 |
| 5,315,901 | 5/1994 | Barnes | 192/3.3 |

*Primary Examiner*—Andrea L. Pitts

[57] ABSTRACT

A control system for engaging and releasing a torque converter bypass clutch and for varying the torque capacity of the clutch by adjusting the torque converter torus chamber pressure in accordance with changing operating variables, the bypass clutch including a clutch release pressure chamber that is maintained at a calibrated pressure threshold valve whereby pressure clutch capacity control is achieved by controlling pressure differential in the converter.

4 Claims, 26 Drawing Sheets

Fig. 4

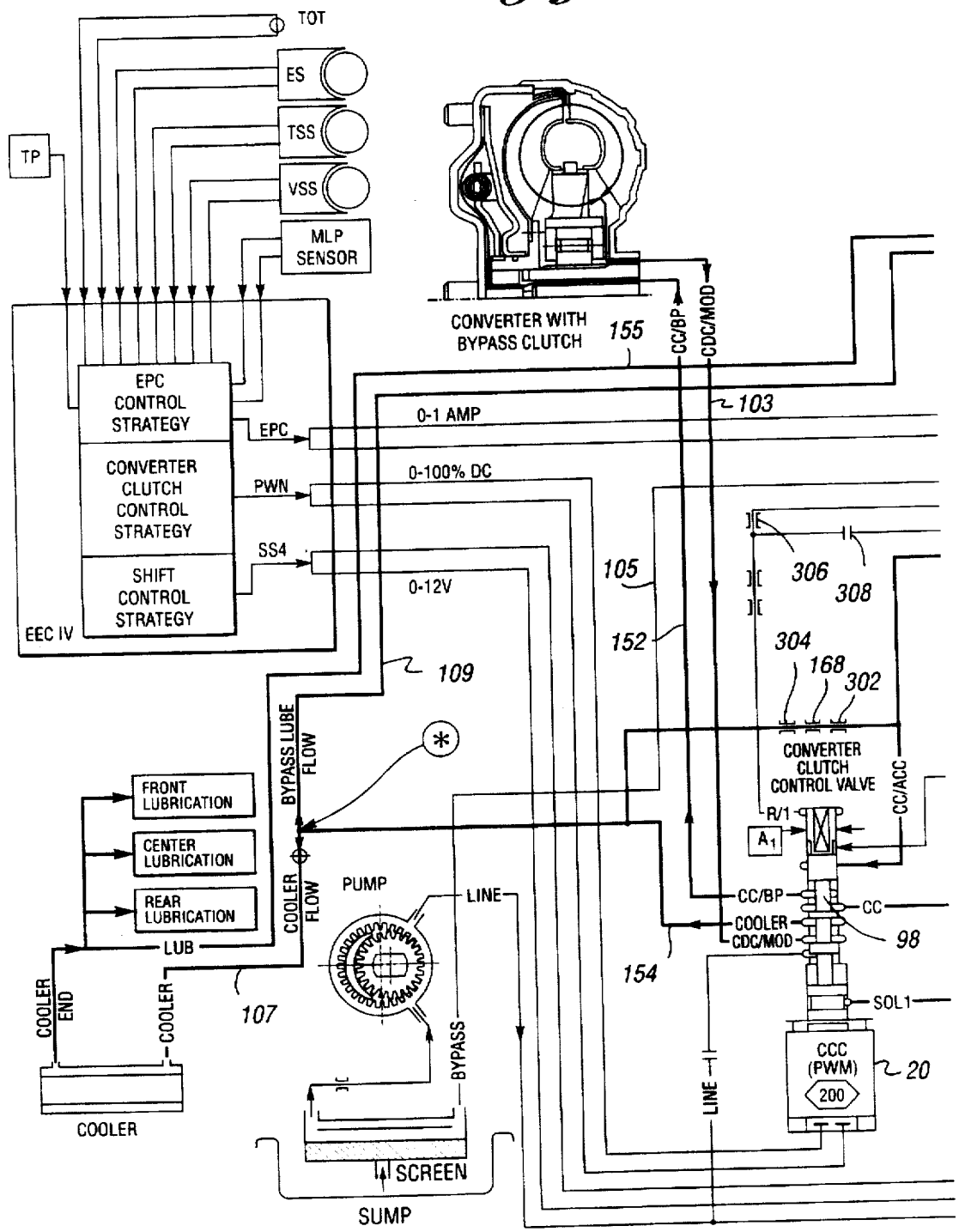
Fig. 5a-a

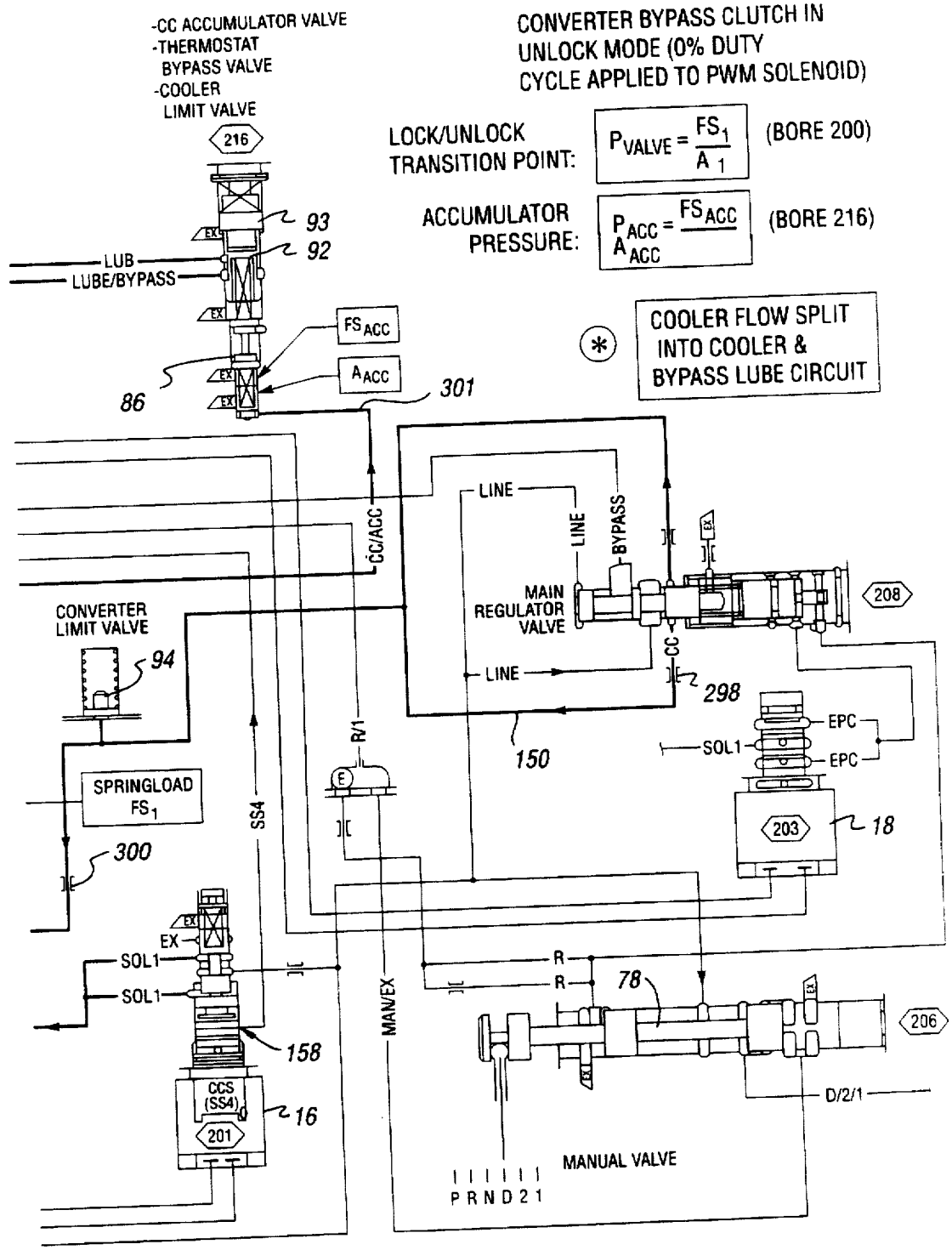

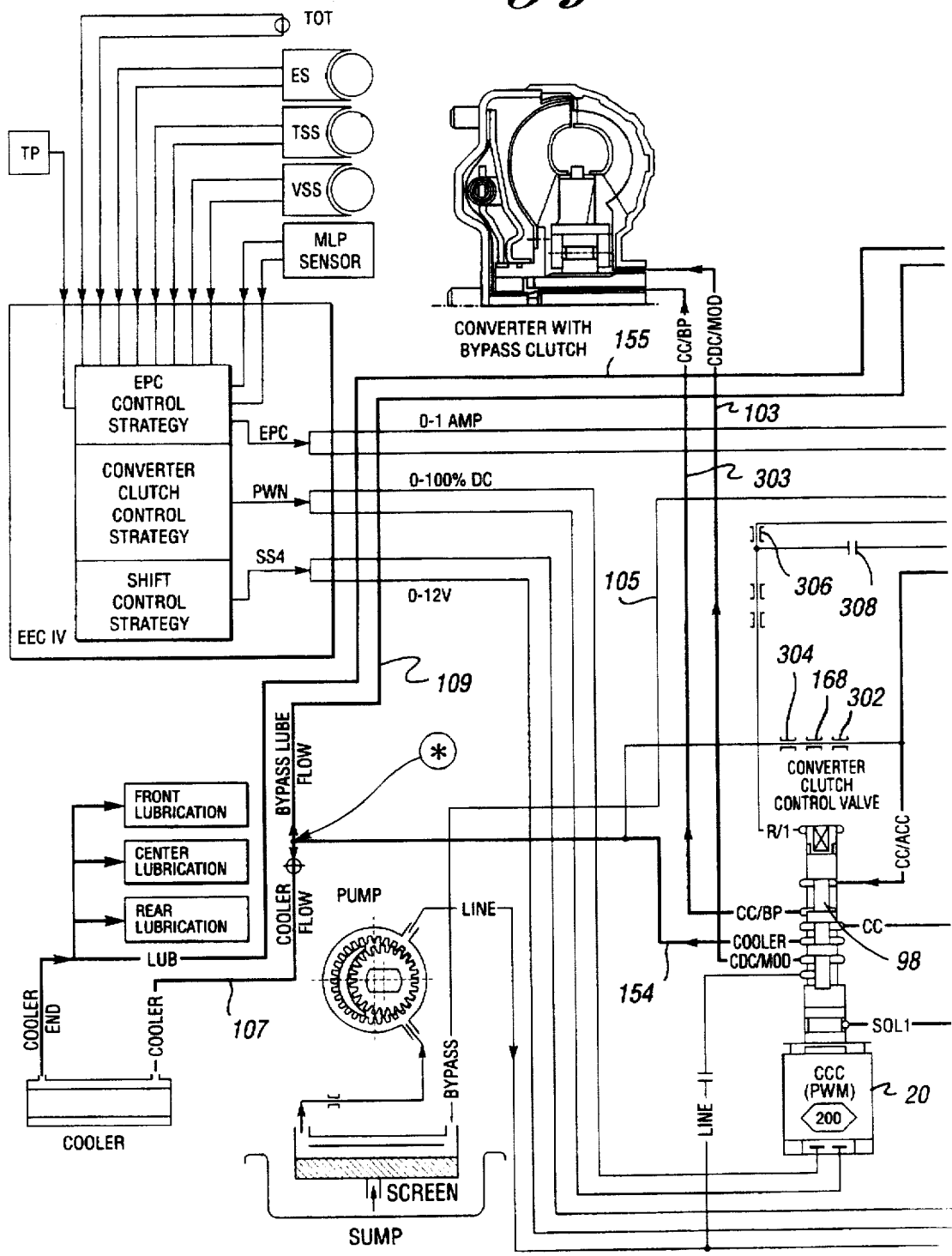
Fig. 5b-a

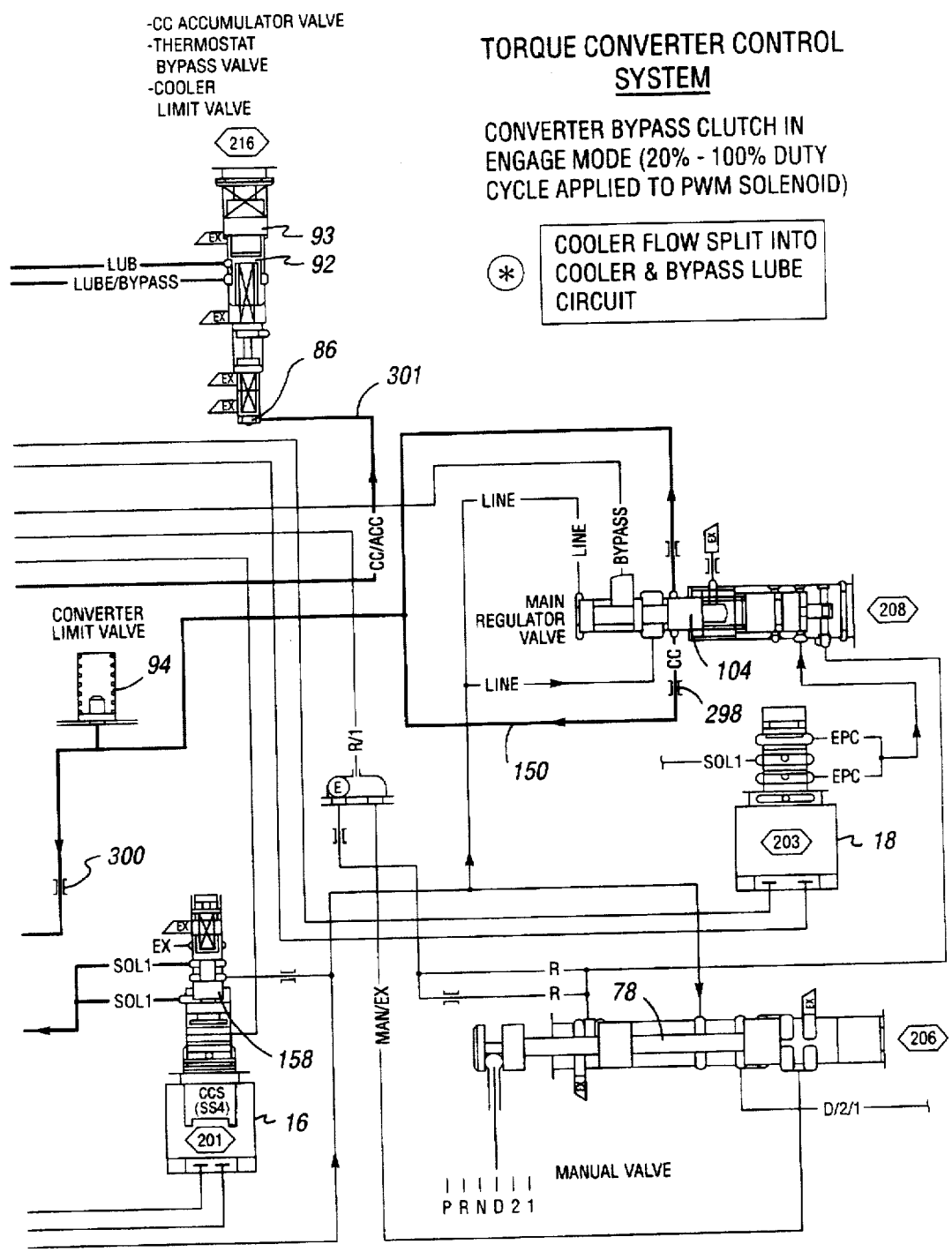

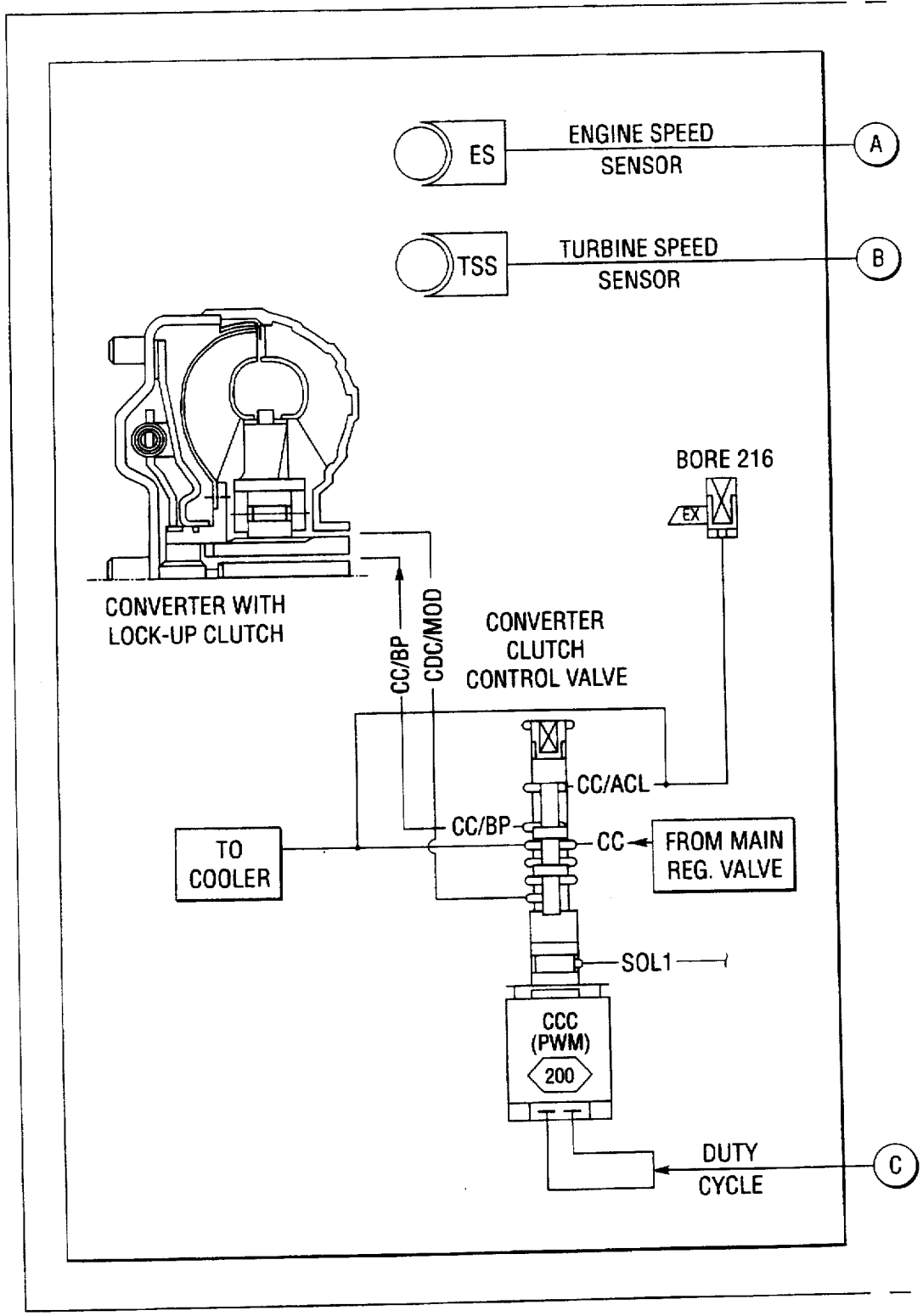
Fig. 5c-a

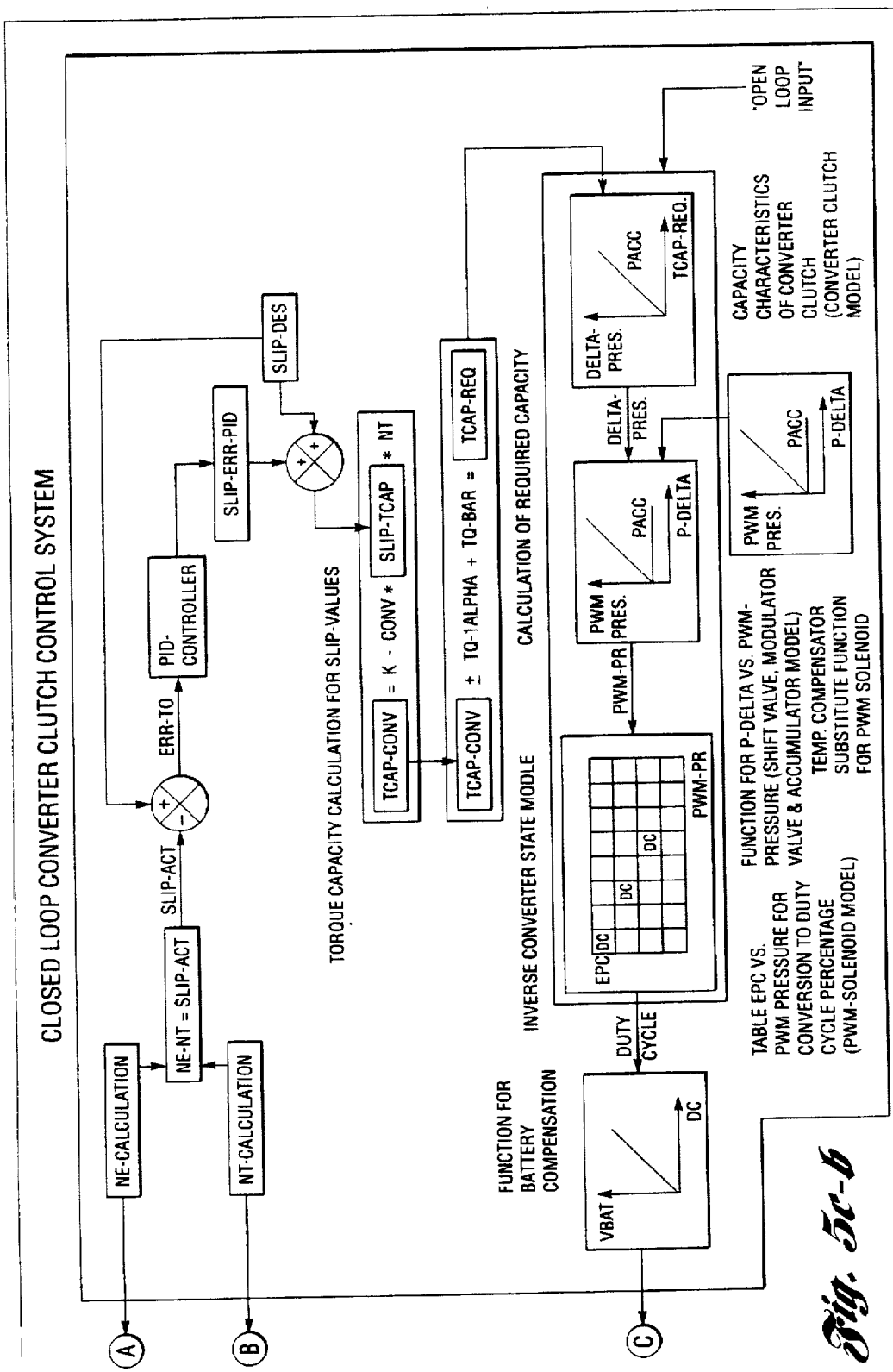
Fig. 5c-b

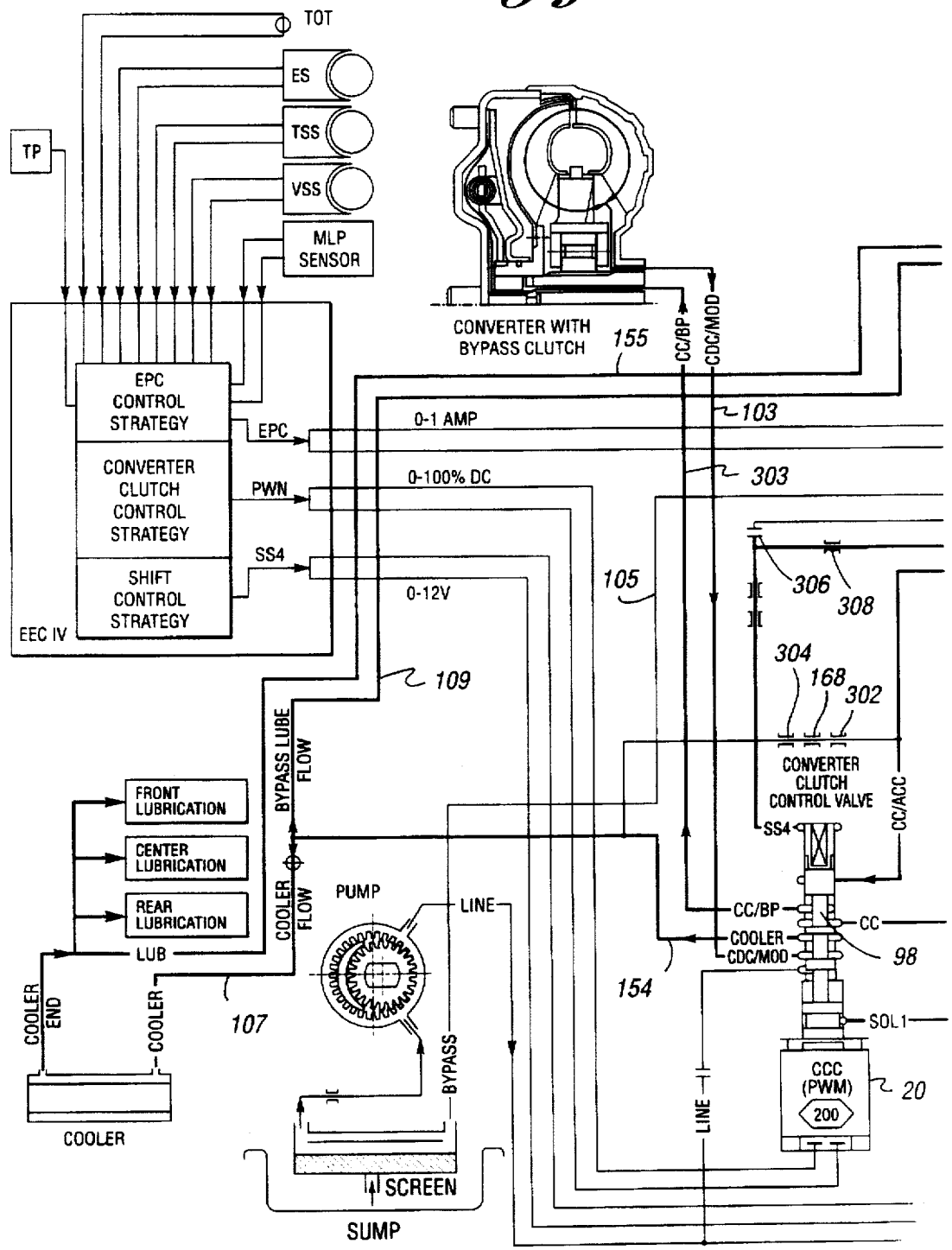
Fig. 11a-a

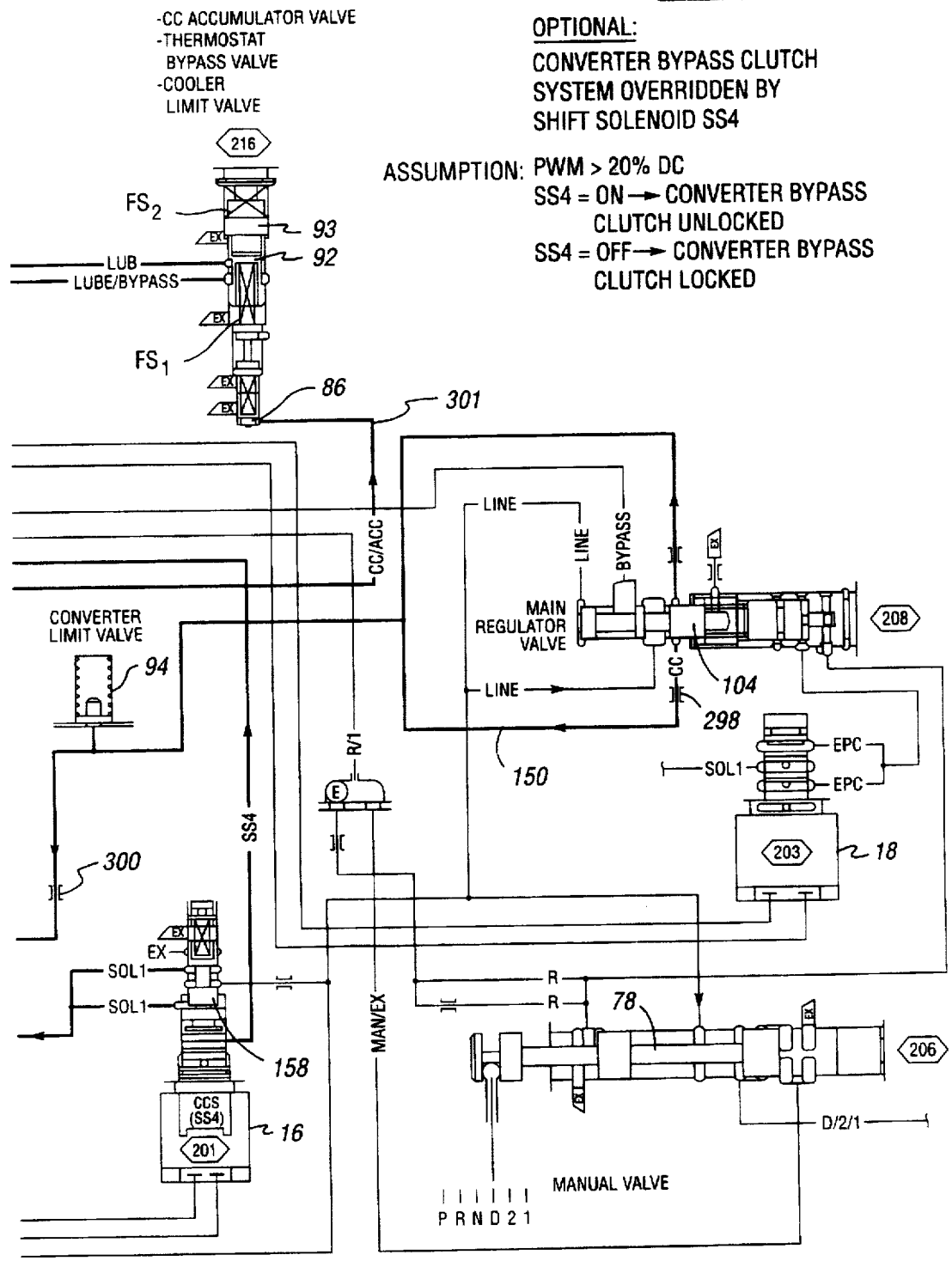
Fig. 11a-b
TORQUE CONVERTER CONTROL SYSTEM
OPTIONAL:
CONVERTER BYPASS CLUTCH SYSTEM OVERRIDDEN BY SHIFT SOLENOID SS4
ASSUMPTION: PWM > 20% DC
SS4 = ON → CONVERTER BYPASS CLUTCH UNLOCKED
SS4 = OFF → CONVERTER BYPASS CLUTCH LOCKED

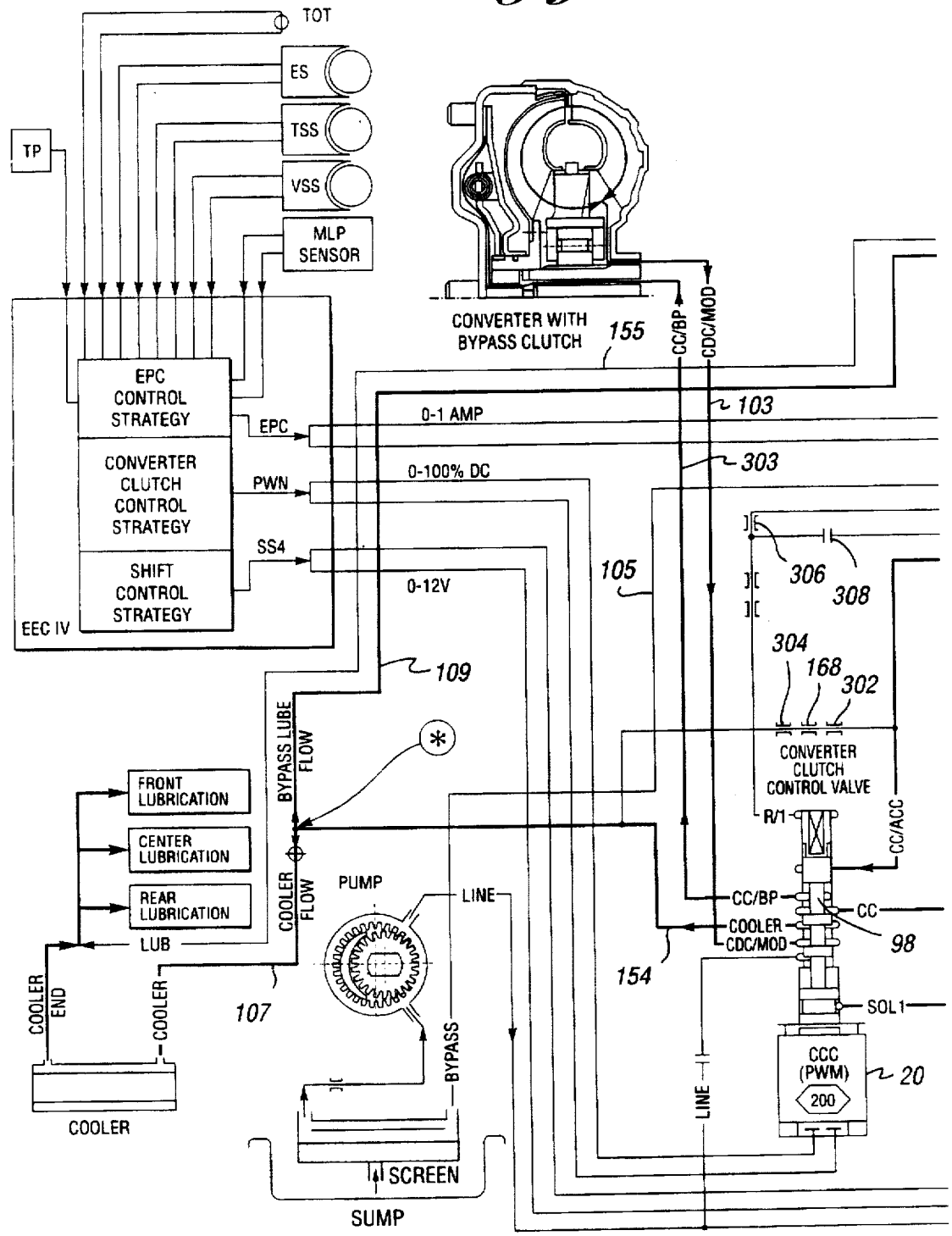
Fig. 11b-a

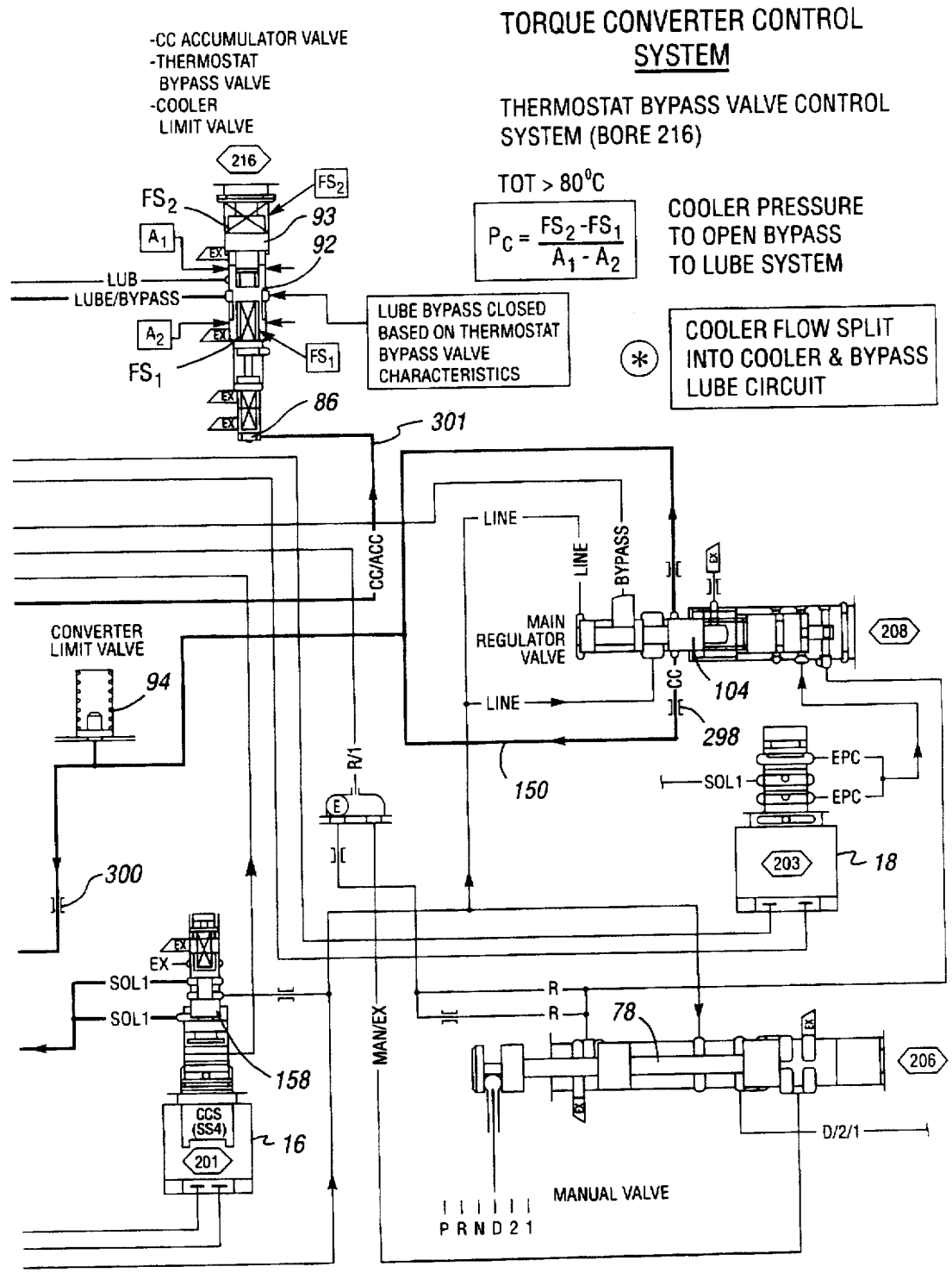
Fig.11b-b

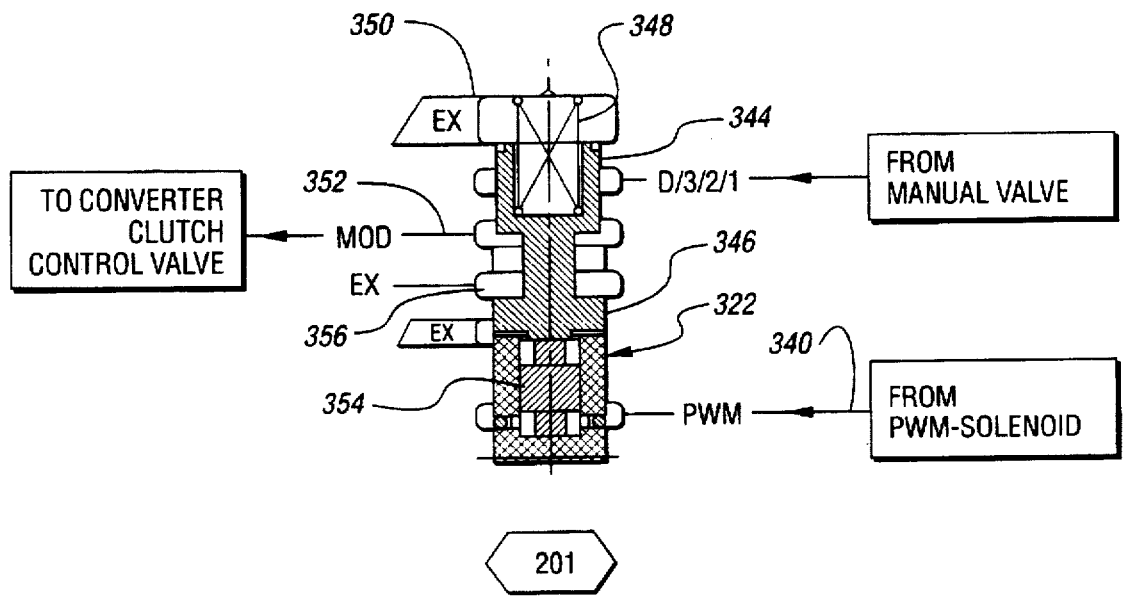
Fig. 17
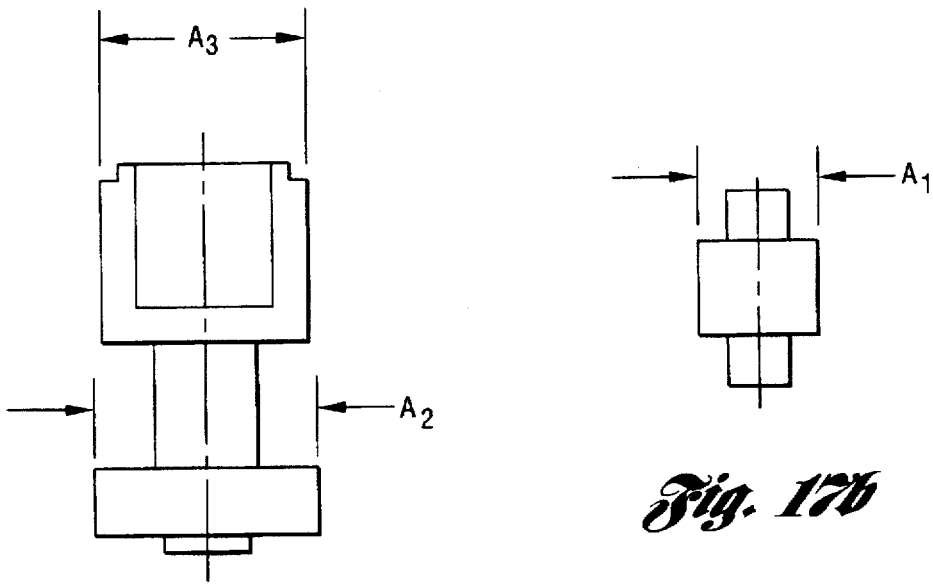
Fig. 17a
Fig. 17b

MULTIPLE RATIO AUTOMATIC TRANSMISSION AND TORQUE CONVERTER

CROSS-REFERENCE TO RELATED APPLICATIONS

This application is a continuation-in-part of U.S. patent application Ser. No. 08/526,457, filed Sep. 11, 1995, now U.S. Pat. No. 5,553,694, which is a division of U.S. patent application Ser. No. 08/323,464, filed Oct. 14, 1994, entitled "Multiple Ratio Automatic Transmission And Control System".

TECHNICAL FIELD

The invention relates to multiple ratio torque converter transmissions for automotive vehicles and to electronic-hydraulic controls for effecting engagement and release of a converter clutch.

BACKGROUND AND SUMMARY OF THE INVENTION

Multiple ratio planetary transmissions situated in an automotive vehicle driveline typically include a hydrokinetic torque converter situated between torque input planetary gearing of the transmission and a throttle-controlled internal combustion engine. The gearing comprises two simple planetary gear units arranged in a manner similar to the gearing arrangement of the well known Simpson gear set. Located between the turbine of the torque converter and the input elements of the Simpson gearing is a third simple planetary gear unit with a friction clutch adapted to connect two elements of the third gear unit together for rotation in unison. A friction brake also is used for anchoring a reaction element of the planetary gear unit. An overrunning coupling establishes one-way torque flow between two elements of the gearing. The brake is arranged in series relationship with respect to the clutch.

A second overrunning coupling in a gear unit of the Simpson gearing is used for the purpose of establishing a non-synchronous ratio shift. Forward engagement is achieved by engaging a forward clutch on a shift from neutral to the drive state. Similarly, a separate reverse engagement clutch is used to establish a torque flow path for reverse. In each instance, turbine speed is used as a feedback signal to initiate the start of the forward or reverse engagement.

Ratio changes between the first ratio and the second ratio on an upshift, as well as a downshift from the second ratio to the first ratio, are achieved in our improved transmission by controlling the engagement of an overrunning clutch. The overrunning clutch is arranged in series relationship with respect to a friction brake as a reaction torque flow path for the friction brake associated with the intermediate ratio is established and disestablished. The braking of the friction brake is accomplished with a closed loop control so that harshness is avoided as the overrunning elements of the reaction torque flow path engage. This is in contrast to prior art arrangements, such as that shown in U.S. Pat. No. 5,157,608, where a non-synchronous shift using overrunning couplings is achieved without the cushioning effect made available by the present invention as the associated friction brake is actuated.

Our invention includes a controller for a torque converter clutch assembly that has a single converter feed passage and a single converter flow return passage. Such converter clutch assemblies are distinguishable from converter clutch assemblies of the kind shown, for example, in U.S. Pat. No. 5,305,663 where a converter bypass clutch feed passage acts in cooperation with two other feed passages, one acting as a flow return and the other acting as a flow delivery to the torus circuit of the converter. In the case of the converter shown in the '663 patent, continuous flow is achieved through the converter regardless of whether the clutch is engaged or released.

Portions of the clutch control strategy of the present invention are common to the teachings of U.S. Pat. No. 5,029,087, issued to Ronald T. Cowan, Roger L. Huffmaster and Pramod K. Jain. As in the case of the converter control of the '087 patent, our present invention includes a controller for continuously monitoring the actual converter slip and comparing that actual value to a desired value. Any error that is detected by the controller will result in calculation of a new target slip. During the engagement time of the converter clutch, the error will continuously change and the magnitude of that error will be monitored continuously. In each instance, a new target slip is calculated. This process continues until the actual slip approaches the target value.

This strategy has been adapted to the so-called two pass converter system described above. In the prior art teachings discussed here, the converter is a three pass system that accommodates continuous flow through the converter regardless of the behavior of the clutch. Notwithstanding the fact that the converter of our present invention has only two flow paths, one toward the converter and the other from the converter, the converter oil flow is capable of maintaining sufficient heat dissipation because of an improved converter flow arrangement in the converter circuit with a converter clutch modulator valve that provides the converter oil flow. The converter oil flow is divided into two components, one part of which is directed to a thermostat bypass valve into a lubrication system as the other flow component enters the transmission oil cooler.

The controller for the converter uses features that are common to the electronically controlled bypass clutch strategy of U.S. Pat. No. 5,303,616 where the percentage of shift completion is used as an input parameter for controlling the engagement of a bypass clutch for a converter, particularly, during ratio changes.

The converter control valve system with which the control strategy is used is capable of accurately adjusting the pressure differential across a converter clutch piston in the converter torus cavity. This involves the use of a single converter pressure modulator solenoid valve or a pressure modulator solenoid valve plus a pressure modulator valve, which directly controls the torus cavity pressure. In contrast, two pressure modulators plus a pressure modulator solenoid valve are required in prior art designs in which the release side of the converter clutch piston is controlled as well as the torus cavity pressure. This feature simplifies the converter control valve system of the present invention.

The valve system of the present invention also uses a simplified accumulator valve to create a controlled back pressure on the release side of the converter clutch piston thereby simplifying the control of pressure differential across the converter clutch piston as converter clutch torque capacity is regulated.

The converter clutch control makes it feasible to operate the converter clutch in each ratio using closed loop feedback control. Inertia torque changes during shifts are moderated in this way, thereby reducing shift harshness. The ability to apply the converter clutch in all gear ratios contributes to improved fuel economy.

Improved performance also is achieved by reducing hydrokinetic power loss during acceleration and deceleration.

BRIEF DESCRIPTION OF THE DRAWINGS

Figure 4:
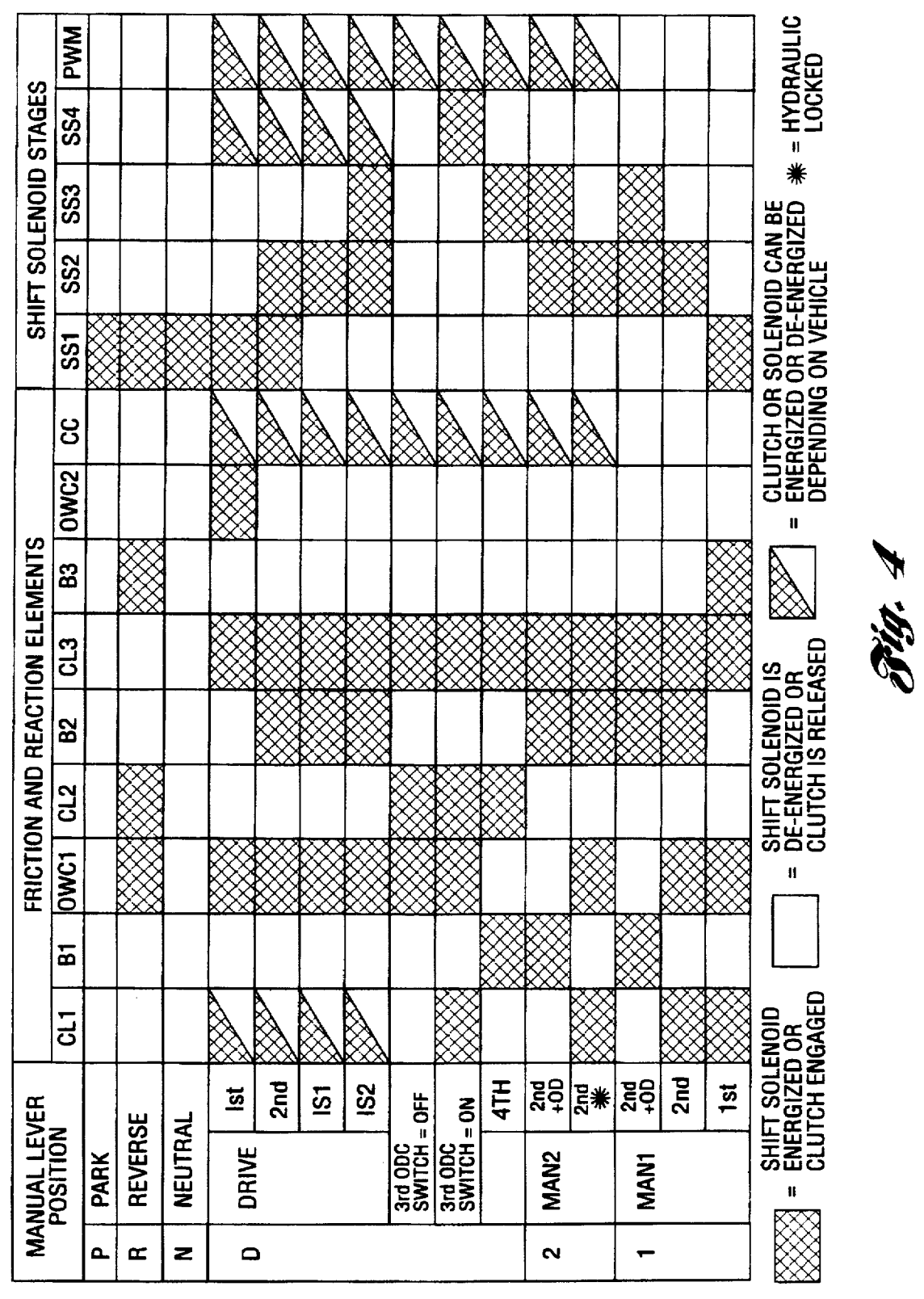

FIG. 4 is a chart that shows the clutch and brake engagement-and-release pattern for the clutches and brakes illustrated schematically in FIG. 2 as the transmission changes ratio;

FIGS. 5a-a and 5a-b are a schematic valve diagram that illustrates the torque converter clutch controls when the clutch is unlocked;

FIGS. 5b-a and 5b-b are a schematic valve diagram similar to the valve diagram of FIG. 5a but with the clutch in an engaged state;

FIGS. 5c-a and 5c-b are a schematic diagram of a closed loop converter clutch control system;

FIG. 5d is a schematic illustration of a torque feed-forward controller for the converter clutch using inverse computer models of the converter, the bypass clutch, the control valve, the modulator valve and the clutch-controlling PWM solenoid;

FIGS. 11a-a and 11a-b are a schematic valve diagram of the torque converter control system with an optional converter bypass clutch overridden by shift solenoid SS4;

FIGS. 11b-a and 11b-b are a schematic valve diagram of the torque converter control system with a thermostat bypass valve for splitting cooler flow into two parts;

FIG. 13 is an enlarged view of the converter control valve assembly that is shown in the circuit diagram of FIG. 12a;

FIG. 14 is an enlarged view of the thermostatic bypass valve and cooler limit valve which are indicated in the circuit diagram of FIG. 12a;

FIG. 17 is an enlarged view of the converter pressure modulator valve which is part of the circuit diagram of FIG. 12b.

PARTICULAR DESCRIPTION OF THE INVENTION

Transmission Hardware Overview:
Transmission Torque Flow

Figure 1:
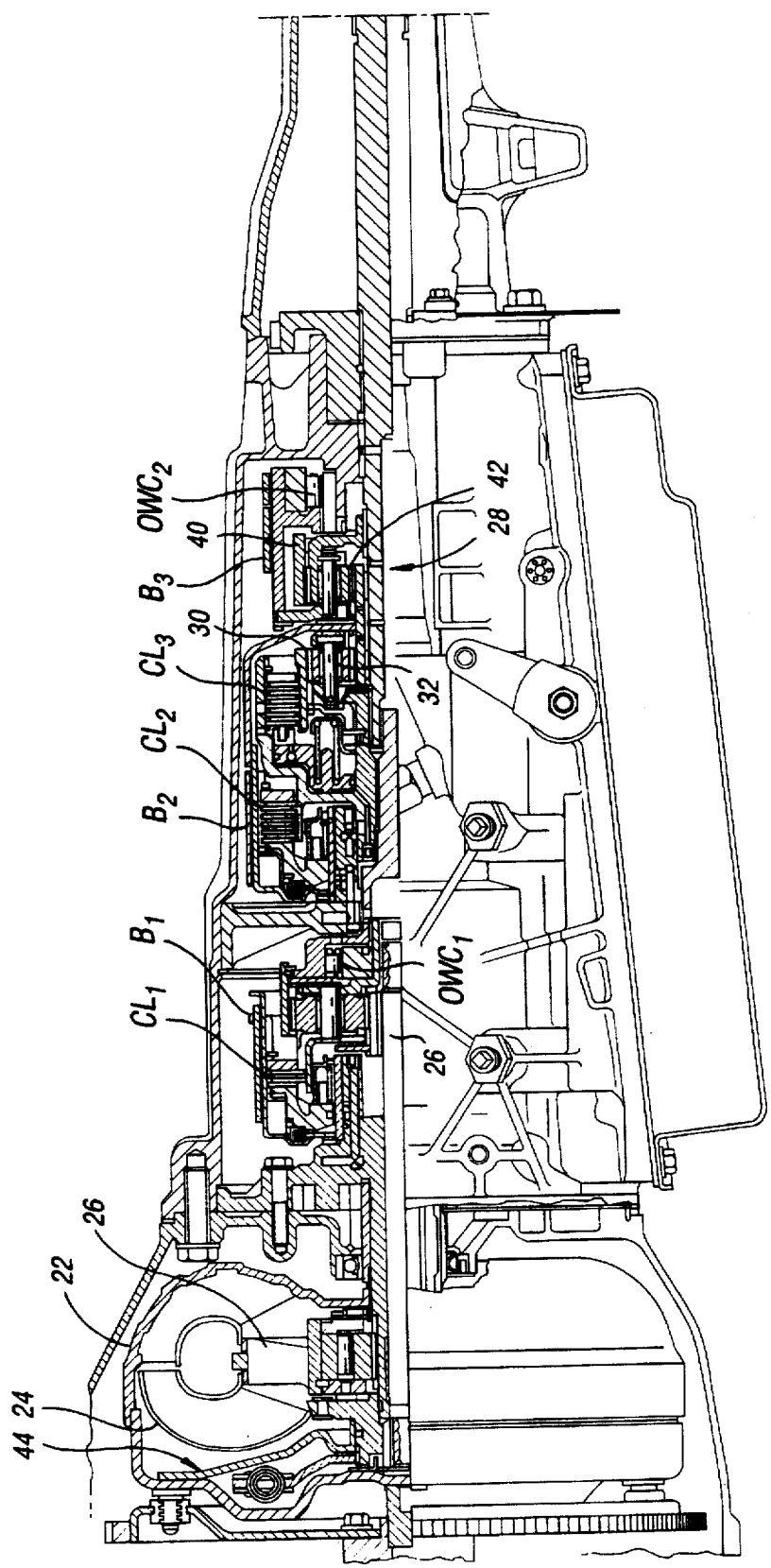
FIG. 1 is a cross-sectional view of a geared planetary transmission adapted to be controlled by our improved control system.
Figure 2:
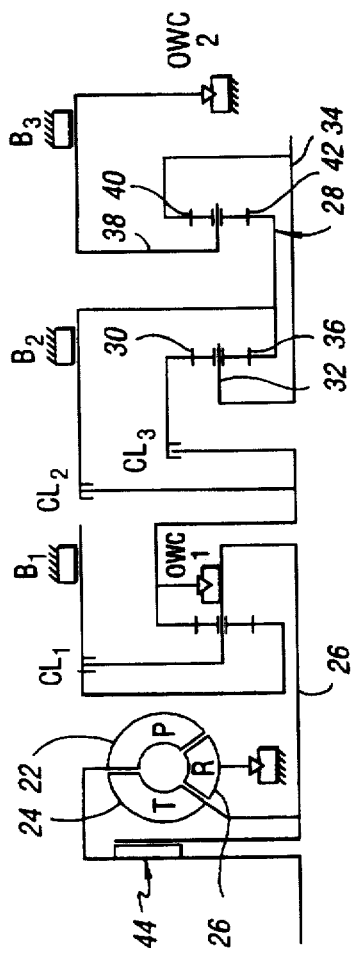
FIG. 2 is a schematic representation of the gearing elements of FIG. 1.
Figure 3:
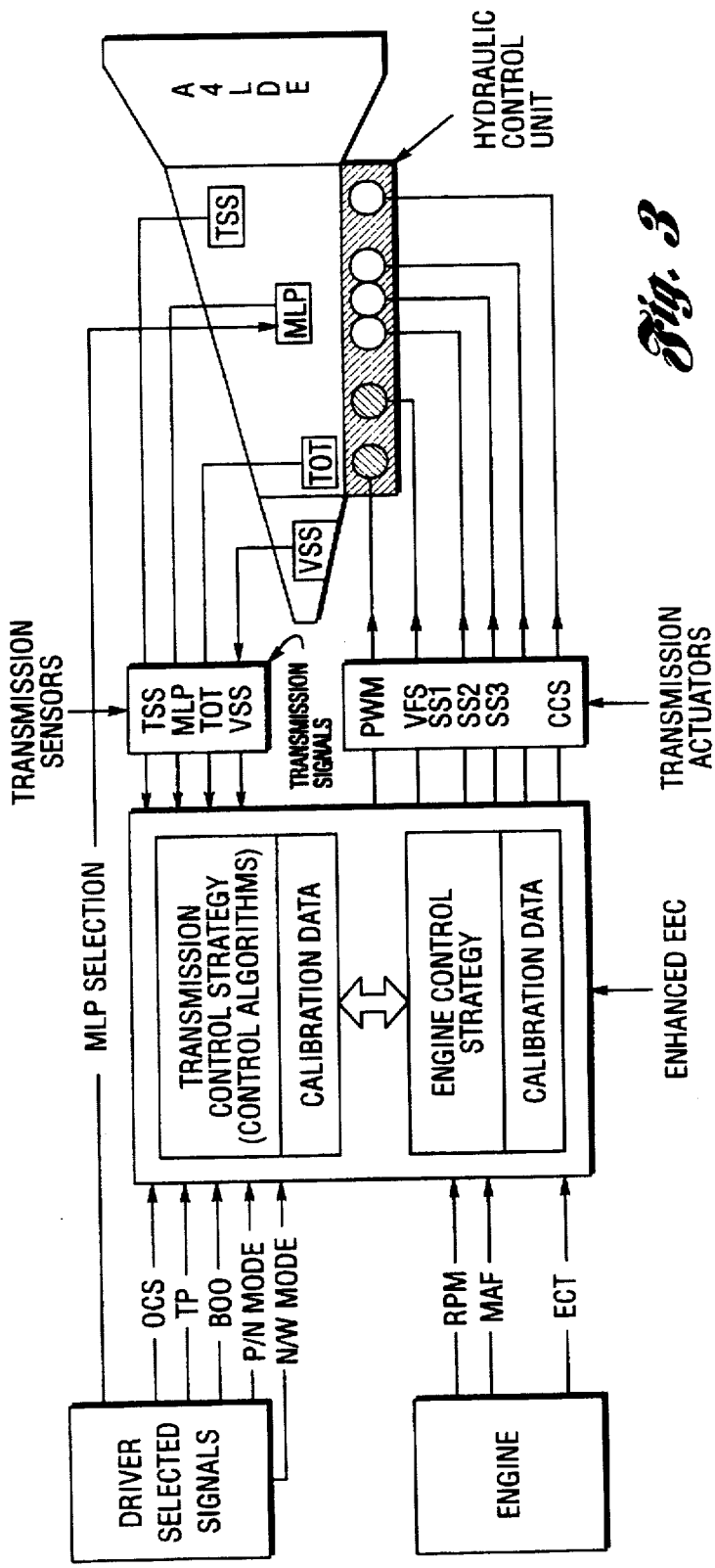
FIG. 3 is a schematic representation of the overall signal flow path for the electronic controller as the transmission control strategy executes control algorithms based on input information from the driver and from the engine itself.

The transmission gearing contains an overdrive planetary gear set connected in series with a Simpson set. FIG. 1 shows the various clutches and bands with conventional abbreviations. FIG. 2 shows, in schematic form, the torque flow paths for the transmission.

Torque Flow 1st Gear In DRIVE

The engine torque is transmitted to the housing of the torque converter pump or impeller 22. The converter impeller is a centrifugal pump which accelerates the fluid inside the torque converter towards the blades of turbine 24. The accelerated oil is then decelerated over the turbine blades. The oil at the turbine exit is redirected over the converter reactor 27 back into the impeller, thereby achieving a torque multiplication effect.

From the input shaft 26, the torque is transmitted to overrunning coupling OWC1, which effects a torque reaction in the rotational direction of the engine. The coupling OWC1 overruns in the opposite direction. The engaged clutch CL3 carries torque from the center shaft to the first of two simple planetary gear units of a Simpson gear set.

The torque is delivered to the ring gear 30 and then is split into two components. One part is delivered over the planetary carrier 32 to the output shaft 34, which turns in the same rotational direction as the ring gear 30. The sun gear 36 carries the remaining part of the torque in the opposite direction to the rear gear set of the Simpson planetary gear set. The planetary carrier 38 of the rear planetary gear set is held by overrunning coupling OWC2. The torque delivered to the sun gear 42 is then transmitted over the planetaries to the ring gear which reduces the velocity and multiplies the torque to the output shaft. This arrangement provides a 2.474 gear ratio.

In coast mode, OWC1 and OWC2 overrun and free wheeling is in effect. The converter clutch 44 stays open until no torque multiplication occurs. It then can be locked.

Torque Flow: 2nd Gear In DRIVE

The torque flow is the same as in 1st gear except that B2 is applied. With the engagement of B2, the sun gear speed is reduced to zero. The brake band (B2) then serves as a reaction element for the front planetary gear set and generates an output torque multiplication of 1.474 by holding 0.474 times engine torque as a reaction to the output. The output of the rear planetary gearset is zero since the sun gear 42 has zero speed (see FIG. 2). The converter clutch 44 can be locked or unlocked in 2nd gear depending on the driving condition.

Torque Flow 3rd Gear In DRIVE,
Overdrive Cancel Switch=OFF

In 3rd gear, B2 is released and CL2 is applied. The transition from 2nd to 3rd gear must be synchronized since no reaction element is available to hold the CL2 drum when B2 is released. The converter clutch can be locked or unlocked depending on the driving condition. The torque input to CL2 and CL3 is split depending on the gear ratio. CL2 carries 0.321 times engine torque and CL3 carries 0.679 times engine torque. The torque flow to CL2 is the same as in 1st or 2nd gear.

With the overdrive cancel switch turned off, the coast clutch (CL1) is disengage—i.e., electronically released—and free wheeling takes place since OWC1 overruns in coast mode (see FIG. 2). This is the direct gear with a gear ratio of one. Since the gear change from 2nd to 3rd and from 3rd to 2nd has to be synchronized, more complex control functions are implemented for these gear changes.

Torque Flow 3rd Gear in DRIVE, Overdrive Cancel Switch=ON

When the overdrive cancel (ODC) switch is ON, CL1 is hydraulically applied and engine braking takes place in coast mode. CL1 is electronically controlled and hydraulically actuated along with B1 (see FIG. 2).

Torque Flow 4th Gear In DRIVE

In 4th gear, B1 is applied and carries –0.25 times engine torque as a reaction to the output. B1 decelerates the sun gear of the overdrive planetary gear set to zero speed and generates a gear ratio of 0.75. Engagement of CL1 is hydraulically inhibited and OWC1 overruns. Since B1 carries 0.25 times engine torque and since the overdrive planetary gear set is an input to the Simpson set, CL2 and CL3 hold 0.75 times engine torque. The gear ratio is 0.75. The converter clutch can be locked or unlocked based on the driving condition (see FIG. 2.)

Torque Flow 1st Gear In MANUAL Position

In MANUAL1, the torque flow is the same as in 1st gear in drive position except B3 and CL1 are applied to generate engine braking in coast mode. The converter clutch is hydraulically inhibited and cannot be applied electronically. B3 prevents overrunning of OWC2, and CL1 prevents overrunning of OWC1. The gear ratio is 2.474 (see FIG. 2).

Torque Flow: 2nd Gear In MANUAL2 Position

In MANUAL2, the torque flow is the same as in 2nd gear in drive position except CL1 is applied to achieve engine braking in coast mode. CL1 prevents overrunning of OWC1 in power OFF condition.

Converter Clutch Control System

The converter clutch control system has a dedicated hydraulic control system as well as a unique control strategy. The converter clutch 44 is electronically controlled and can be engaged in each gear. Usually, the converter clutch will be locked starting in second gear, and it stays locked. By monitoring engine speed NE and the turbine speed "NT", the state of the converter clutch or the amount of slip is determined.

In order to be able to lock the converter clutch in each gear, the converter clutch must be modulated during a shift. It is then necessary to partially open the torque converter clutch during upshifts and downshifts in order to take advantage of the damping effect of the torque converter during a shift. The control system is able to adjust for the desired amount of differential speed during an upshift event or a downshift event. This requires a control system which is capable of adjusting capacity of the converter clutch.

Converter clutch control systems for some known transmissions are partially electronically controlled (ON/OFF-solenoid) and are only capable of controlling the converter clutch in either "ON" or "OFF" states. This restricts the converter clutch operation only to operation in fourth or third gear.

The converter clutch control system of the present invention can be operated as a simple ON/OFF system since the clutch capacity can be varied from 0% to 100%. It can also be operated, however, as a "full" modulated clutch with continuous slip under all operating conditions.

Figure 5B:
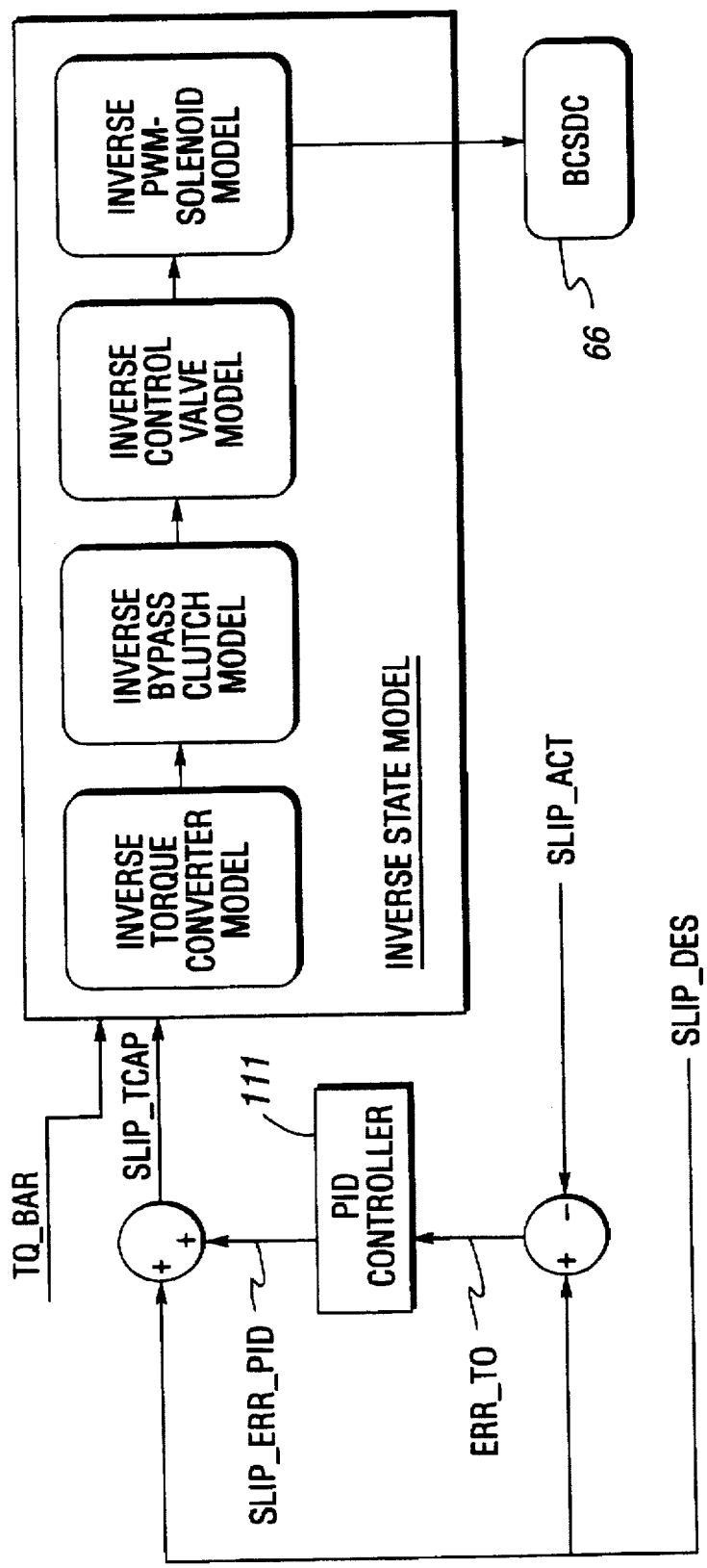
Figure 12A:
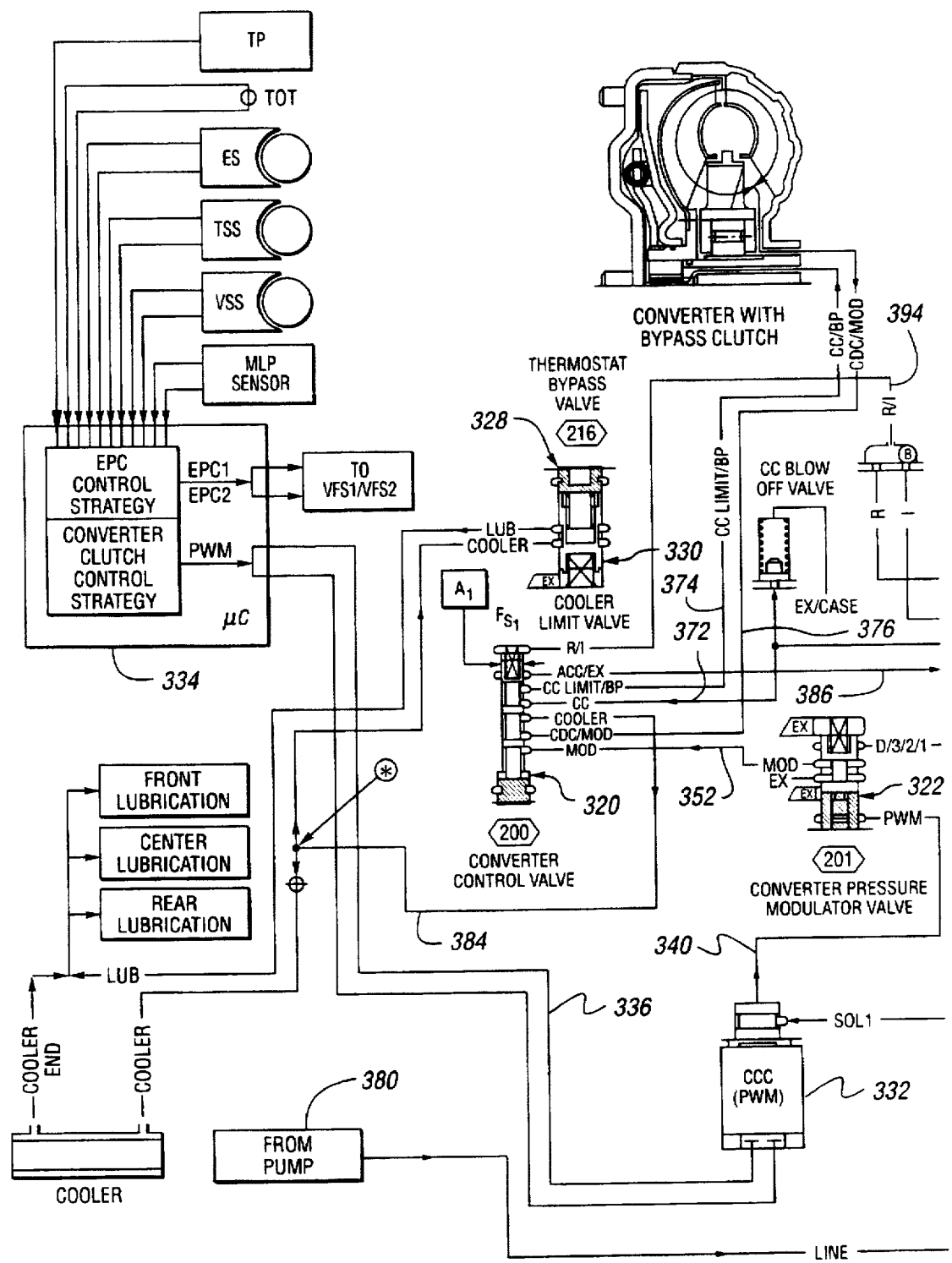
FIGS. 12a and 12b, taken together, show a circuit diagram for an alternate embodiment of the invention.
Figure 12B:
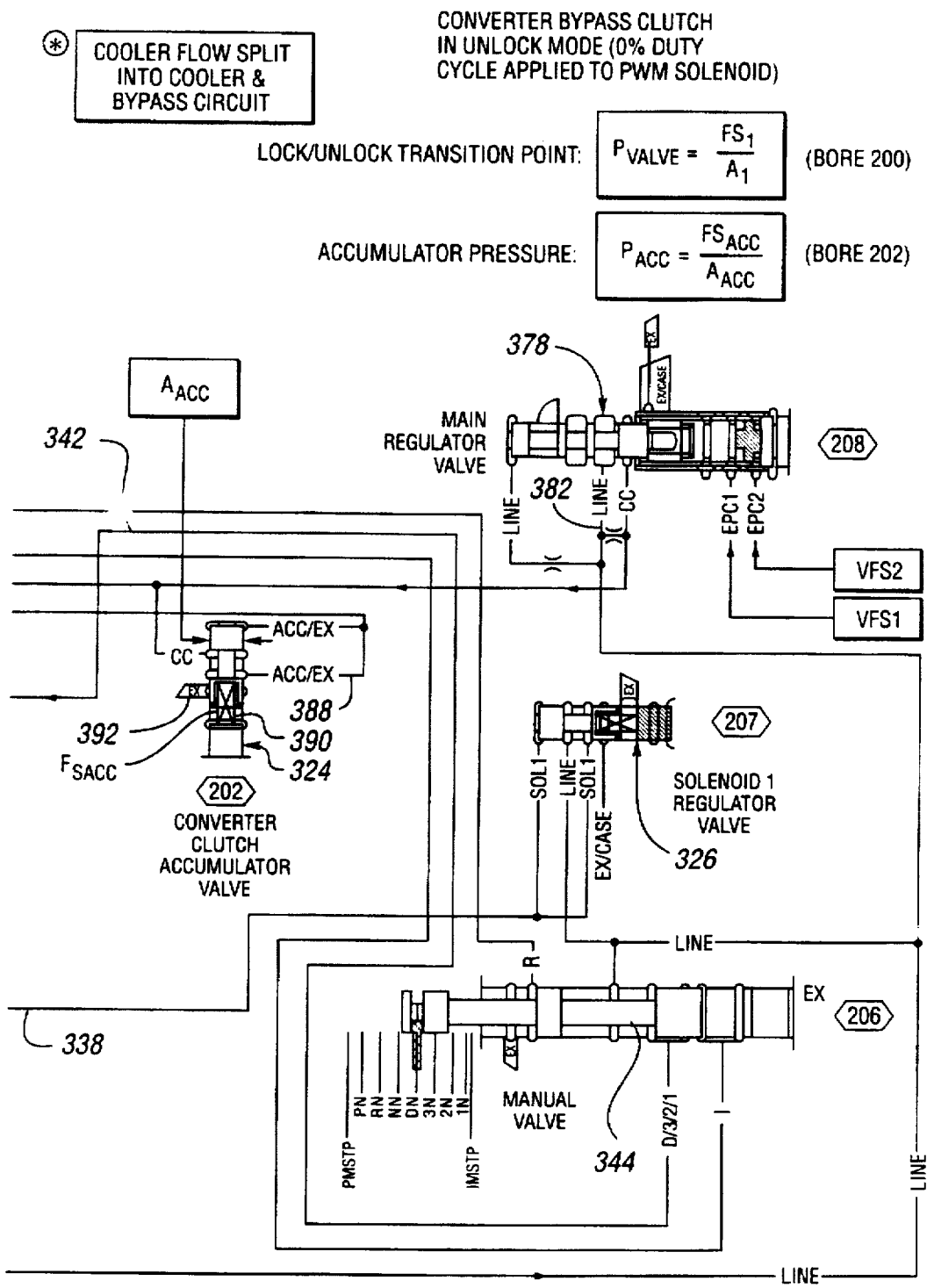

The converter clutch 44 can be controlled with three different hardware configurations, i.e.:

1. PWM-solenoid controlled converter clutch;
2. PWM-solenoid controlled converter clutch in conjunction with shift solenoid 16 (SS4), as seen in FIGS. 5a–5b; and
3. PWM-solenoid controlled converter clutch with a converter pressure modulator valve disposed between the PWM-solenoid and the converter clutch control valve as seen in FIGS. 12a–12b.

The converter clutch control strategy will be described for each configuration. A brief description of the strategy has been set forth previously. The cooling system with a thermostat bypass valve system also will be described.

Following hardware components are part of the converter clutch control system of hardware configurations 1 and 2, as well as the cooling and thermostat bypass valve control system:

Pressure Buildup:

main regulator valve 104 in bore 208 solenoid 1 pressure regulator 158 in bore 201

VFS variable force solenoid 18 in bore 203

PWM solenoid 20 in bore 200 converter limit valve 94 (blow-off valve)

Shift Valve Configuration:

converter clutch control valve 98 in bore 200 shift solenoid (SS4) 16 in bore 201 thermostat bypass valve 93 in bore 216 cooler limit valve 92 in bore 216 converter clutch accumulator valve 86 in bore 216.

The following are the control parameters for the complete control system of hardware configurations 1 and 2, including the control strategy:

Control Strategy:
 NE=engine speed
 NT=turbine speed
 SLIP_ACT=actual slip=(NE-NT)
 ERR_TO=difference between actual slip and desired slip.
 SLIP_ERR_PID=total PID slip error
 SLIP_DES=desired slip for converter clutch
 SLIP_TCAP=total slip desired
 K_CONV=torque converter coefficient
 TCAP_CON=torque being carried by the torque converter
 TQ_IALPHA=torque value to hold inertia torque
 TQ_BAR=engine torque
 TCAP_REQ=requested torque capacity
 BCSDC=percentage of duty cycle
 GR_DS=desired gear
 GR_CM=commanded gear
 FLG_SS_4=shift solenoid flag 4
 PCSFTCMPT=percentage shift complete
 SLIP_TARGET=target slip value
Pressures:
 CDC/MOD=converter discharge/modulation pressure
 CC/PACC=converter charge/accumulator pressure SS4=shift solenoid 4 pressure
SOL1=shift solenoid 1 pressure.

1. PWM Solenoid Controlled Converter Clutch

Hydraulic Control System Unlock Mode (0% duty cycle. See FIGS. 5a-a and 5a-b)

The torque converter is a two-pass, reverse-flow torque converter. In unlock mode, 0% duty cycle voltage is applied to the PWM solenoid. Zero percent duty cycle produces zero output pressure from the PWM solenoid. The converter clutch control valve 98 in bore 200 is in the downshift position. A converter charge pressure is produced by the main regulator 104 system in bore 208.

At the main regulator 104, line pressure is in equilibrium with EPC output pressure produced by variable force solenoid 18 in bore 203. The surplus oil generated by the line pressure regulation is directed into the pump BYPASS circuit 105 and into the converter charge (CC) passage 150. The surplus oil in the converter charge circuit builds up the converter charge (CC) pressure. The converter charge pressure is distributed through orifices 298 and 300 as an input pressure to the converter clutch control valve 98 in bore 200. The converter limit valve 94 (blow-off valve) limits the CC pressure to a maximum level of 8 bar.

The converter charge pressure is directed over the downshifted converter clutch modulator valve 98 into the CC/BP circuit and finally to the torque converter. The charge oil enters the torque converter at the back side of the converter clutch plate into the converter torus. It serves as the transmitting medium for the torque converter function. Converter oil then enters the converter discharge circuit 103 (CDC) and is redirected to an input port of the converter clutch control valve 98 in bore 200. From the converter clutch control valve, the discharge oil enters the cooler circuit 154 and is split into two flow components. One part is directed over the thermostat bypass valve directly into the lubrication circuit 155. The other oil flow component enters the cooler first and then the lubrication circuit. The cooling and lubrication system is described subsequently in detail.

A metered amount of cooler flow is bypassed through the control orifice 302 and orifices 168 and 304 into the CC/ACC circuit. This bypassed oil serves as a feed to the converter clutch accumulator system in bore 216. The purpose of this accumulator system is explained subsequently.

Lockup Mode 20%–100% Duty Cycle
(see FIGS. 5b-a and 5b-b)

In lockup mode, the duty cycle of the PWM solenoid is raised to a value between 10% and 20% depending on the input pressure (see FIG. 7) in order to produce enough output pressure to overcome the spring load in bore 200. The converter clutch control valve moves into upshift position. Solenoid 1 pressure is the input pressure to the PWM solenoid 20. Solenoid 1 pressure is produced by the solenoid 1 regulator valve 158 in bore 201. The regulator valve 158 limits line pressure to 8 bar. Hence the input pressure to the PWM solenoid 20 varies between idle line pressure (4 bar) and the limiting threshold of the solenoid 1 regulator (8 bar). The pressure limitation is required in order not to exceed the cracking pressure of the PWM solenoid. The cracking pressure is currently set at 10 bar.

When the converter clutch control valve 98 is upshifted, the front land of the valve opens the pressure output port of the PWM solenoid to the CDC/MOD circuit, which is connected to the converter clutch apply side. The converter clutch thus is directly controlled by the PWM solenoid. This requires a "HIGH FLOW" PWM solenoid design in order to satisfy the stroke volume of the clutch itself and to cover the cooling flow to the clutch.

At the same time the last land opens the accumulator circuit 301 (CC/ACC) to the CC/BP circuit 303, which is connected to the back side of the converter clutch plate. As mentioned previously, a converter clutch accumulator valve 86 is installed in bore 216. The accumulator is fed with cooler oil supplied by the control orifice 302. The pressure threshold is determined as follows (see FIGS. 5a-a and 5a-b):

$$PACC = FSacc/Aacc,$$

where

PACC=accumulator pressure

FSacc=accumulator spring force

Aacc=area of accumulator valve

The metered oil supply in the accumulator circuit is limited to the above-mentioned pressure threshold. The surplus oil is released over the exhaust port of the accumulator valve.

The threshold of the converter clutch control valve 98 is determined as follows (see FIGS. 5a-a, 5a-b and 7):

$$PVALVE = FS1/A1$$

PVALVE=pressure threshold of converter clutch control valve

FS1=spring load of converter clutch control valve 98 in bore 200

A1=area of converter clutch control valve

Figure 7:
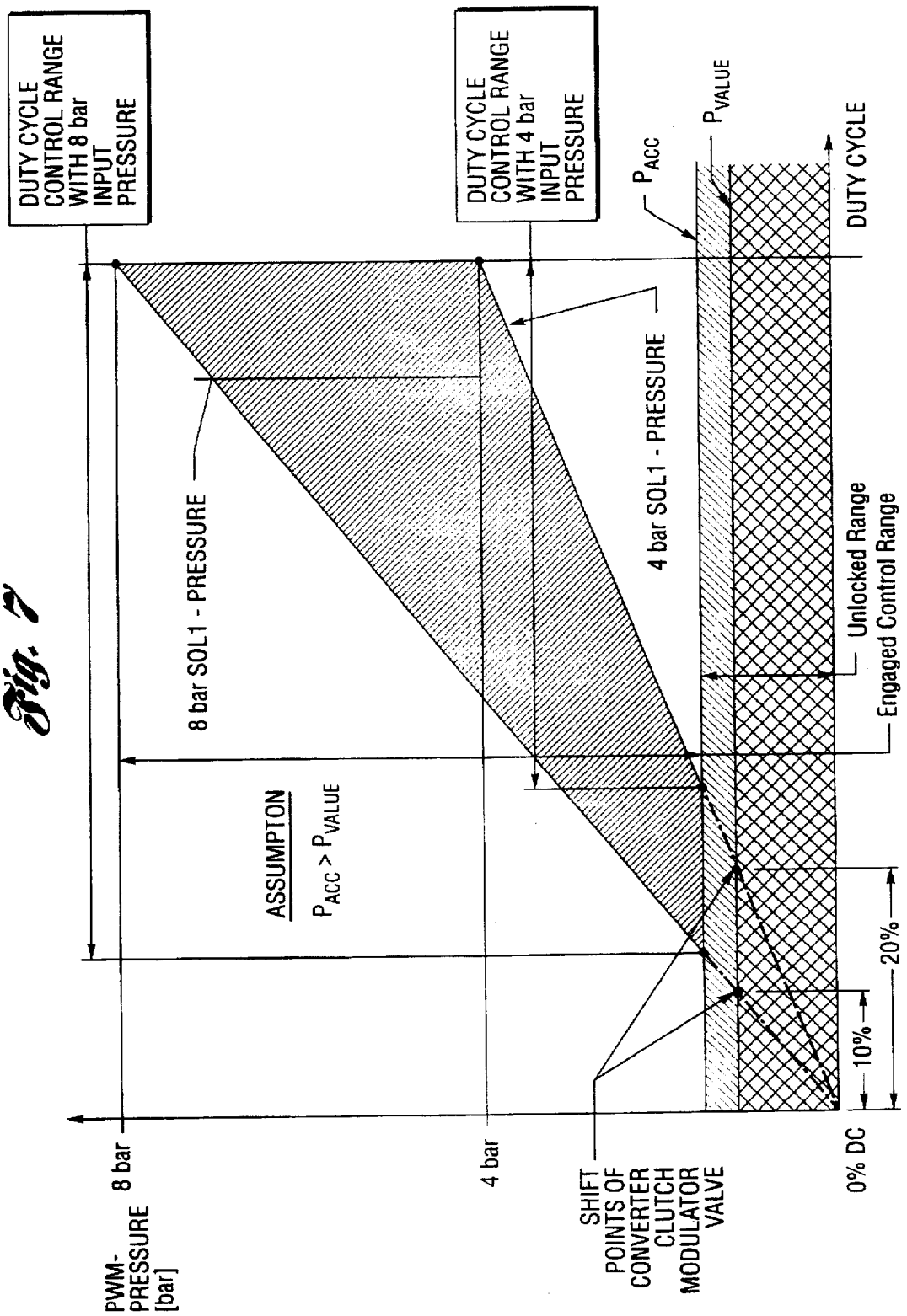
FIG. 7 shows the pressure characteristics for the converter bypass clutch controlled by a PWM solenoid only.

With the converter clutch control valve 98 upshifted in bore 200, the output pressure of the PWM-solenoid 20 is directly applied to the front side of the converter clutch. The pressure characteristic applied to the converter bypass clutch 44 is determined by the input pressure to the PWM-solenoid. The graph of FIG. 7 shows the relationship of PWM pressure to percent duty cycle. The two linear pressure lines represent the pressure characteristics with 4 bar and 8 bar input pressure. The lower end is limited by the accumulator threshold PACC. The shadowed area represents the pressure control range applied to the converter clutch. The accumulator pressure is applied on the back side of the converter clutch plate and reduces the clutch capacity due to pressure applied at the front of the clutch plate. With the accumulator pressure threshold PACC set higher than the shift valve threshold PVALVE, any Δ-pressure between the PWM solenoid pressure characteristic and the accumulator threshold can be adjusted. This accumulator system will equalize the applied capacity on the converter clutch when the converter clutch control valve 98 is upshifted. The ability to adjust any Δ-pressures on the converter clutch produces the ability to adjust any Δ-speed targets for variable torque inputs. Without the accumulator system, the capacity determined by the PVALVE threshold would be applied every time the converter clutch control strategy commands a transition from unlock to lock up mode. Further, the adjustment of a slip target value by the control strategy could only be accomplished with a certain amount of input torque since the PVALVE pressure threshold would already account for this amount of input torque.

With this pressure characteristic applied to the converter clutch, a variable capacity control is achieved. With feedback control applied to this system, the converter clutch can be controlled under all desired operating modes; i.e., unlock mode, slip mode or "full" lock up mode with 100% capacity. The converter clutch control valve is hydraulically interlocked with 1/R pressure, which means that converter clutch control operation is inhibited when the manual valve 78 is in REVERSE and MAN1 position.

The upshifted converter clutch control valve 98 in bore 200 redirects the converter charge pressure in lock up mode into the cooler circuit 154. The cooler pressure is split into two flow paths, which are the cooler flow passage 107 and the bypass lubrication flow passage 109 (see FIG. 5b-a and 5b-b).

Converter Clutch Module

Figure 5E:
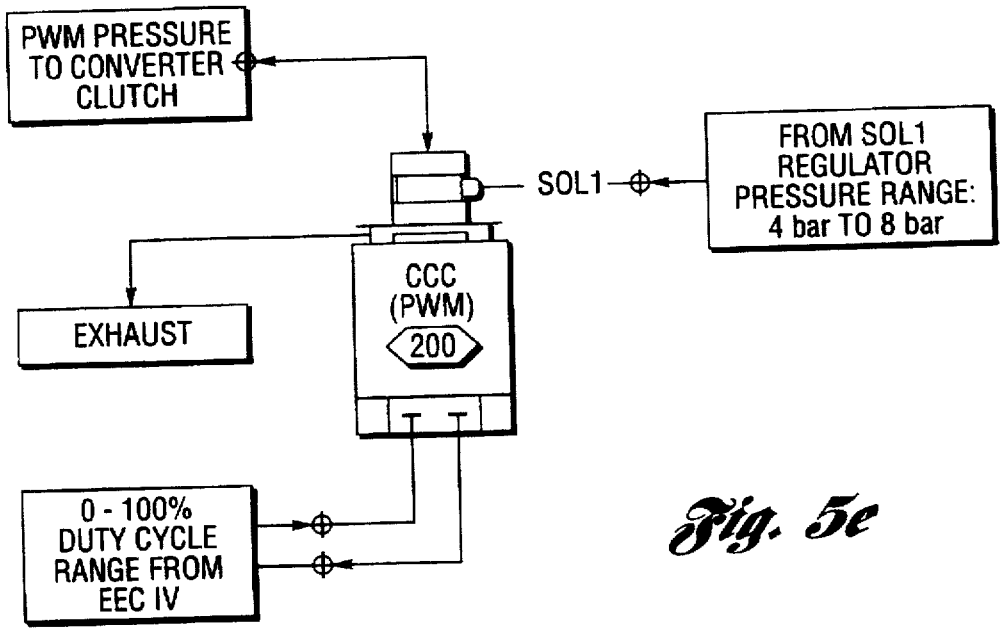
FIG. 5e is a block diagram showing the relationship between the clutch-controlling PWM solenoid, the converter clutch and SOL1 pressure.
Figure 5F:
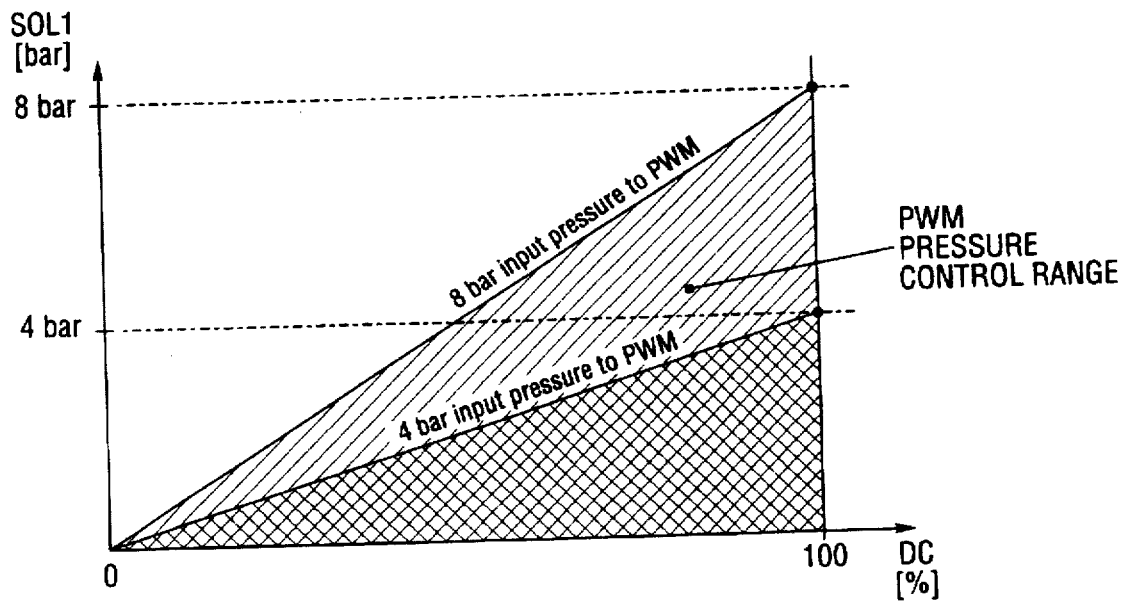
FIG. 5f is a graph showing the relationship between duty cycle for the clutch-controlling PWM solenoid and SOL1 pressure for two different input pressure characteristics.

The converter clutch module 109 within the electronic engine control module is dedicated to the control of the converter bypass clutch. The major output register is the bypass clutch duty cycle called BCSDC. This duty cycle is applied to the PWM-solenoid 20, which converts the duty cycle signal into an output pressure (see FIGS. 5e and 5f). The converter clutch module is sub-divided in the following major sub-modules:

A) lock up/unlock shift schedule
B) hot lock up shift schedule
C) scheduled bypass clutch slip
D) torque feed forward system
E) modulation over a shift
F) unconditionally unlock module.

A) Lock up/unlock shift schedule

This module contains a shift pattern TP vs. VS to lock or unlock the converter bypass clutch in each gear. Based on these shift curves, the converter clutch can be locked in 2nd, 3rd and 4th gear.

B) Hot lock up shift schedule

The converter clutch shift schedule can be modified when the transmission oil temperature (TOT) (sensed by TOT sensor 99) has exceeded a certain value. An open torque converter can contribute to excessive heat generation under heavy load driving conditions. The engine throttle position is sensed by sensor 107. In order to prevent overheating of the torque converter and the transmission, the converter can be locked at earlier vehicle speeds. The vehicle speed sensor is shown at 105.

C) Scheduled bypass clutch slip

This module determines the "TARGET" bypass clutch slip values depending on the driving condition. It loads the target slip values into a register called SLIP_TRG_S. The target slip value is then used to PID (proportional, integral, derivative) control the actual slip (SLIP_ACT) to the target value.

D) Torque feed forward system

For a description of a clutch torque feed forward controller, reference may be made to U.S. Pat. Nos. 5,123,302 and 5,121,820 to supplement this description. These patents, which are assigned to the assignee of this invention, are incorporated herein by reference.

The "torque feed forward" system of the present invention contains an "inverse state model" of the converter clutch. As seen in FIG. 5d, the input to this model is the input torque TQ_BAR and SLIP_TCAP, which is the total desired slip across the torque converter. The output from this inverse model is the bypass clutch duty cycle BCSDC, as shown at 66. The inverse model basically includes an inverse torque converter model, an inverse bypass clutch model, an inverse control valve model and an inverse PWM-solenoid model. SLIP_TCAP is the sum of the desired slip SLIP_DES and the PID-controlled slip SLIP_ERR_PID. ERR_TO is the difference between SLIP_ACT and SLIP_DES.

This slip error is used to calculate, with the PID-controller gains, the amount of PID-controlled slip. Assuming that the converter hardware correlates with the inverse model, the calculated duty cycle should generate the amount of slip asked by SLIP_TCAP. FIG. 5d shows the complete system.

This system has the advantage of controlling a converter clutch system partially open loop and partially closed loop. This is done by increasing or decreasing the amount of PID-controlled slip (SLP_ERR_PID) (see FIG. 5c-a and 5c-b). The calculated total slip is then fed along with the input torque through the inverse model.

At any operating mode when the converter clutch has to be controlled by adjusting a target slip value, this control system is in effect. The complete control system is described in detail below.

E) Modulation over the shift

The "modulation over the shift" controls the desired slip value across the torque converter when a shift is taking place. The converter clutch can be modulated during upshifts and downshifts. The major tool for adjusting a slip value during a shift is the torque feed forward system described above. The complete system is described subsequently.

F) Unconditionally unlock module

This module is responsible for unlocking the torque converter clutch completely, which means that the BCSDC value is set to zero percent. This produces zero pressure on the converter clutch apply side and unconditionally unlocks it. Unconditional unlock is commanded when extreme driving conditions take place; i.e., braking, tip-in, tip-out, closed throttle condition, etc. The unconditional unlock system for the transmission is shown and described below.

Components Of Converter Clutch Control System

The hydraulic control system for the converter are included in the system drawings of FIGS. 5a-a, 5a-b, 5b-a and 5b-b.

The hydraulic control system for the converter, which is packaged in a main control assembly, includes:

valve body with 16 valve bores numbered from 200 to 216 including connecting pressure passages
shift solenoid 16 (SS4)
1 PWM-solenoid 20
1 accumulator valve 86
1 thermostat valve 93
1 blow off valve
1 main regulator valve including a booster valve 104
1 manual valve
cooler limit valve 92
solenoid 1 modulator valve 158
converter clutch control valve 98.

Converter Clutch Control Strategy

The overall converter clutch control strategy was described previously. The torque feed forward system applied to the converter clutch control hardware now will be described (see FIG. 5c-a, 5c-b and 5d).

The system is designed as a closed loop control system. Engine speed "NE" and turbine speed "NT" are fed back into the control strategy. From the sensed engine and turbine speed signals provided by engine speed sensor ES (101) and turbine speed sensor 103, respectively, the actual speed values are calculated. From the turbine speed "NT" and the engine speed "NE", the actual slip SLIP_ACT is calculated. The difference between the actual slip value SLIP_ACT and the desired slip value SLIP_DES is the slip error ERR_TO. This slip error is input to a PID-controller 111 which calculates the total PID slip error SLIP_ERR_PID consisting of proportional, integral and derivative terms. The desired slip SLIP_DES is then added to the PID slip error SLIP_ERR_PID resulting in the total slip desired SLIP_TCAP. This addition operation enables the control strategy to meter the amount of closed loop control and open loop control by adjusting the PID-controller gains accordingly. With the total desired slip SLIP_TCAP calculated, this slip value then is converted into a torque capacity setting. The torque capacity on the converter clutch to adjust the total desired slip SLIP_TCAP is determined by:

$$TCAP\_REQ = TQ\_BAR \pm TQ\_INALPHA - TCAP\_CONV,$$

where:

TCAP_REQ=total requested torque capacity on converter clutch;

TQ_BAR=input torque;

TQ_INALPHA=inertia torque; and

TCAP_CONV=torque carried by the torque converter.

The TCAP_CONV torque value is the amount of torque that is not transmitted by the converter clutch plate. It is carried by the torque converter and has to be subtracted from the total input torque consisting of engine torque and inertia torque. This amount of torque is calculated from the total desired slip value SLIP_TCAP, times the turbine speed NT, times a converter clutch constant K_CONV. Hence:

$$TCAP\_CONV = NT * K\_CONV * SLIP\_TCAP,$$

where:

NT=turbine speed;

K_CONV=torque converter coefficient constant; and

SLIP_TCAP=total slip calculated from the desired slip and the PID controller.

The total requested torque capacity TCAP_REQ is now transformed into a duty cycle by an inverse state model of the complete converter clutch control system. This inverse state model consists of three functions. The first function is the capacity characteristic of the converter clutch with the TCAP_REQ value as an input, providing a requested DELTA-pressure as an output. The converter clutch capacity characteristic is a linear function pressure versus clutch capacity. The DELTA-pressure is an input for a control function of the control valve 98 and the accumulator valve system 86. Since the converter clutch valve is only an ON/OFF type of shift valve, only the accumulator pressure is here considered. The accumulator pressure is subtracted from the DELTA-pressure resulting in the required PWM-pressure. At this point a temperature compensation function for the PWM-solenoid 20 is finally input to a table (EPC versus PWM-pressure) to convert the PWM-pressure into a duty cycle (FIG. 5c-b). This table is EPC dependant since the input pressure to the PWM-solenoid, which is solenoid 1 pressure (SOL1), varies with the EPC output pressure of the variable force solenoid.

Since the PWM-solenoid is a high impedance solenoid, the resulting duty cycle has to be compensated with battery voltage. This is done by a function VBAT versus DC. The final duty cycle is applied to the PWM-solenoid, which produces the required pressure to accomplish a slip target requested by the calculated SLIP_TCAP value.

This inverse state model is designed to accomplish a fast capacity adjustment when the input torque changes. The inverse torque capacity calculation, in combination with the inverse converter state model, enables the control system to react in a closed loop controlled manner very fast to various torque changes in order to adjust the desired slip value. This prevents unnecessary heat generation in the torque converter due to excessive slip values which could be triggered from input torque changes. This control strategy is called "torque feed forward."

Figure 8:
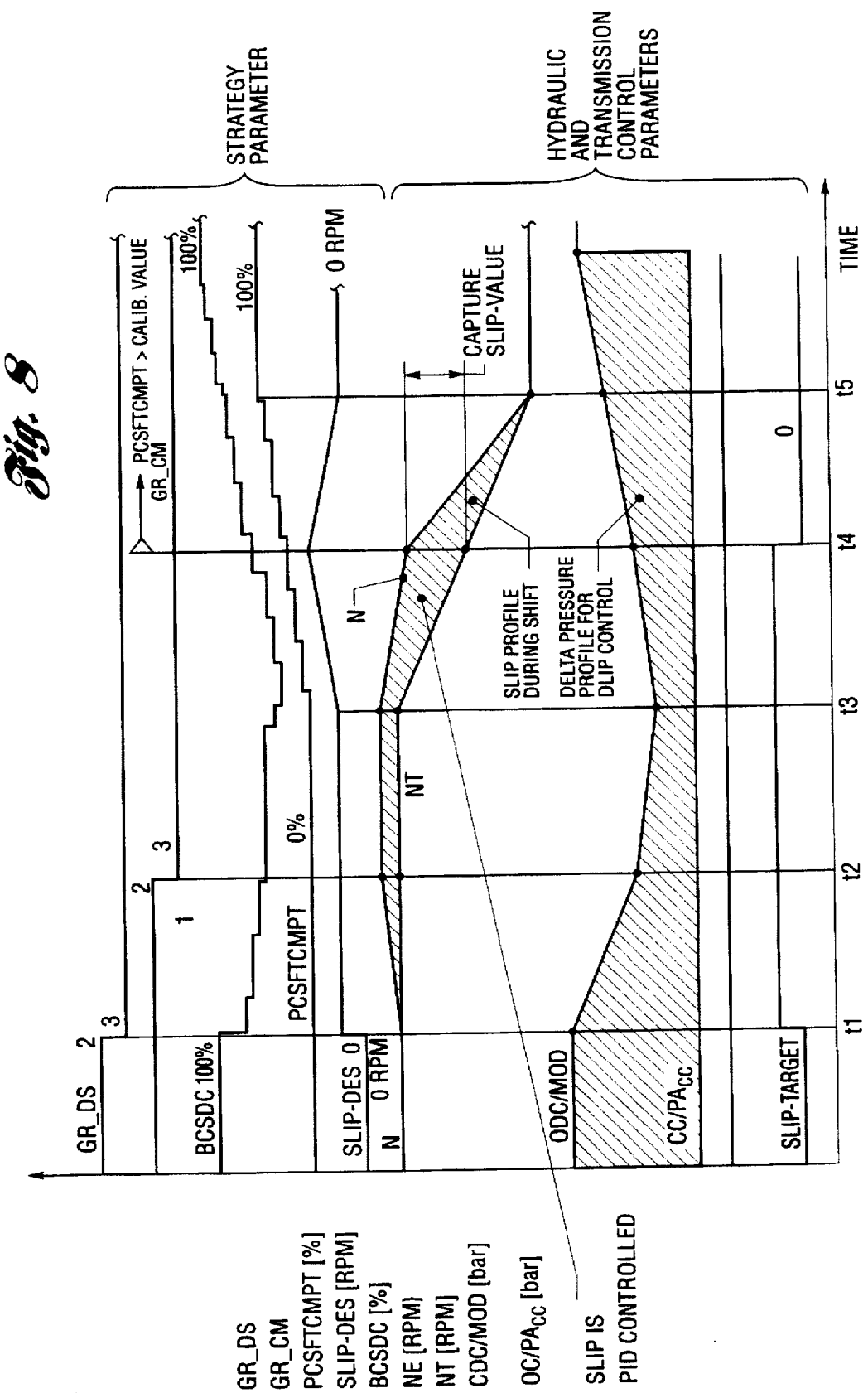
FIG. 8 shows a timing diagram for the engagement of a converter clutch during a 2-3 shift.

In order to illustrate the converter clutch control system variables, FIG. 8 shows how the converter clutch is controlled during a 2–3 upshift. Partial slip values are adjusted by the above described closed loop converter clutch control system during a 2–3 upshift event.

t1:

Control Strategy (see FIGS. 8 and 6):

The driver desires a 2–3 upshift, which is triggered by functions of throttle position versus vehicle speed. The GR_DS register is changed to 3, and the shift verification timer TM_VER_SFT is loaded. A desired slip value SLIP_DES is commanded according to the target slip value SLIP_TARGET, and the duty cycle output register BCSDC reduces the duty cycle value from 100% to an initial value. The converter clutch control strategy adjusts during the shift verification time the desired amount of slip during closed loop control, which is imperceptible to the driver.

Control Hardware:

The PWM-solenoid reduces the CDC/MOD pressure from the maximum pressure to the pressure that is equivalent to the applied duty cycle. The converter clutch loses capacity and the engine rpm starts to rise.

t2:

Control Strategy (see FIGS. 8 and 6):

The shift verification timer TM_VER_SFT is expired and the gear commanded register GR_CM is changed to 3. The shift solenoid flags are set or reset according to the shift solenoid states to execute a 2–3 upshift. The SLIP_DES value stays at the previous value.

The converter clutch control strategy calculates the required torque capacity during closed loop control in order to adjust the desired slip value SLIP_DES. The inverse state model converts the required torque capacity into a duty cycle input to the PWM-solenoid.

Control Hardware:

The shift solenoids are energized or de-energized according to the state of the shift solenoid flags. The duty cycle of the voltage applied to the PWM-solenoid is transformed into a PWM-pressure to adjust the desired slip value in a closed loop controlled manner.

t3:

Control Strategy:

At this point the actual shift is executed. Engine speed and turbine speed decrease. The control strategy monitors the percentage shift complete register. The desired slip value SLIP_DES increases. Since the target slip value SLIP_TARGET is smaller than the desired slip value SLIP_DES, the duty cycle percentage increases. This is based on the increasing slip error ERR_TO, which is input to the PID-controller. Hence the PID-controller calculates lower slip values resulting in higher duty cycle settings.

Control Hardware:

The high clutch (CL2) transmits torque and the 2–3 upshift is initiated. The turbine speed drops and introduces higher slip values triggered by the upshift event. The slip desired value SLIP_DES increases and higher percentages of duty cycle are commanded. This increases the PWM-pressure and the converter clutch capacity in order to reduce the amount of slip.

t4:

Control Strategy:

The percentage shift complete register PCSFTCMPT is greater than a calibratable value. At this point the target slip value SLIP_TARGET is set to zero and the actual slip value is captured. The duty cycle BCSDC increases dramatically in order to reduce the amount of slip.

Control Hardware:

The pressure on the converter clutch increases according to the desired duty cycle value. The DELTA-pressure profile increases dramatically in order to reduce the slip value to the commanded target slip value SLIP_TARGET.

Control Strategy:

The desired slip value SLIP_DES is zero and equal to the target slip value SLIP_TARGET. The previously captured slip value is decayed from the capturing point to zero rpm slip. The decaying process has to be synchronized with the 2-3 upshift event.

Control Hardware:

The pressure on the converter clutch has increased to a level where zero rpm slip is present. The 2-3 upshift is completed, and the achievement of zero slip on the converter clutch is concurrent with the completion of the shift.

The hatched area of FIG. 8 between engine rpm and turbine speed shows the closed loop operation of the converter clutch. The DELTA pressure applied on the converter clutch is also shown as a hatched area.

Figure 6:
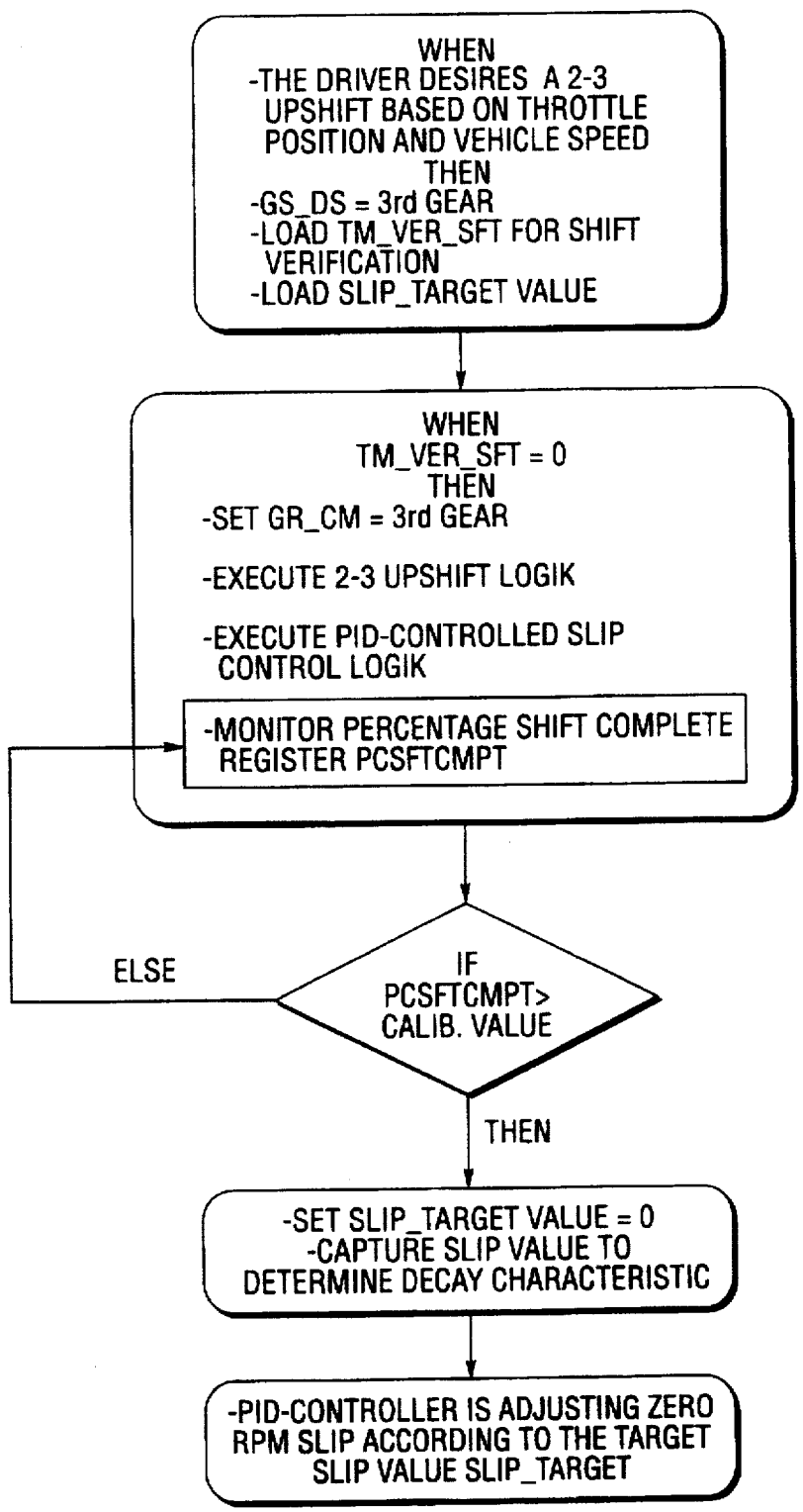
FIG. 6 shows a converter clutch control strategy in flow diagram form indicating the behavior of the clutch during a 2-3 upshift.

The control strategy is shown in the flow diagram of FIG. 6.

2. PWM-Solenoid Controlled Converter Clutch In Conjunction With Shift Solenoid 4 (SS4)

This is an optional feature to enhance the converter clutch control system (see FIG. 11a-a and 11a-b) by using shift solenoid 4 (SS4).

The hydraulic control system is generally identical to the control system described previously. The only difference is the disconnection of the 1/R pressure by closing orifice 306 (FIG. 11a-a and 11a-b), and the connection of pressure of shift solenoid 4 (SS4), shown at 16, on the back of the converter clutch control valve 98 in bore 200 by opening orifice 308. This option provides an additional control feature to override the PWM-function.

One reason for implementation of this option is that the pressure decay from a 100% pressure level to the transition threshold of the converter clutch control valve "PVALVE" may be too long. The reason for the increased pressure decay period of the PWM-solenoid is due to the additional volume from the converter clutch, which has to be exhausted through the PWM-solenoid exhaust ports. The additional volume is triggered by the deformation of the converter clutch plate when the PWM-pressure is applied. However, the long exhaust period can trigger unstable converter clutch conditions during a transition from lock up mode to unlock mode which results in a harsh converter clutch disengagement.

With the shift solenoid 4 (SS4) energized, the converter clutch control valve 98 is downshifted independently of the PWM-pressure. The control valve moves to downshift position and the converter modulator oil is allowed to enter the release chamber on the backside of the converter clutch plate. The PWM-pressure is disconnected from the converter clutch apply side and the converter clutch plate is released immediately. The converter clutch is then unlocked. When the shift solenoid 4 (SS4) is de-energized, the converter clutch control valve moves into upshift position and the converter clutch again is engaged.

Converter Clutch Control Strategy With Shift Solenoid 4 (SS4)

The shift solenoid 4 feature can not only be used to accelerate the transition from lock-up mode to unlock mode, but it can also be used to reduce the amount of converter clutch slip during the upshift event. The same control strategy is used, as previously described, including the required changes for shift solenoid 4 (SS4) control.

Figure 10:
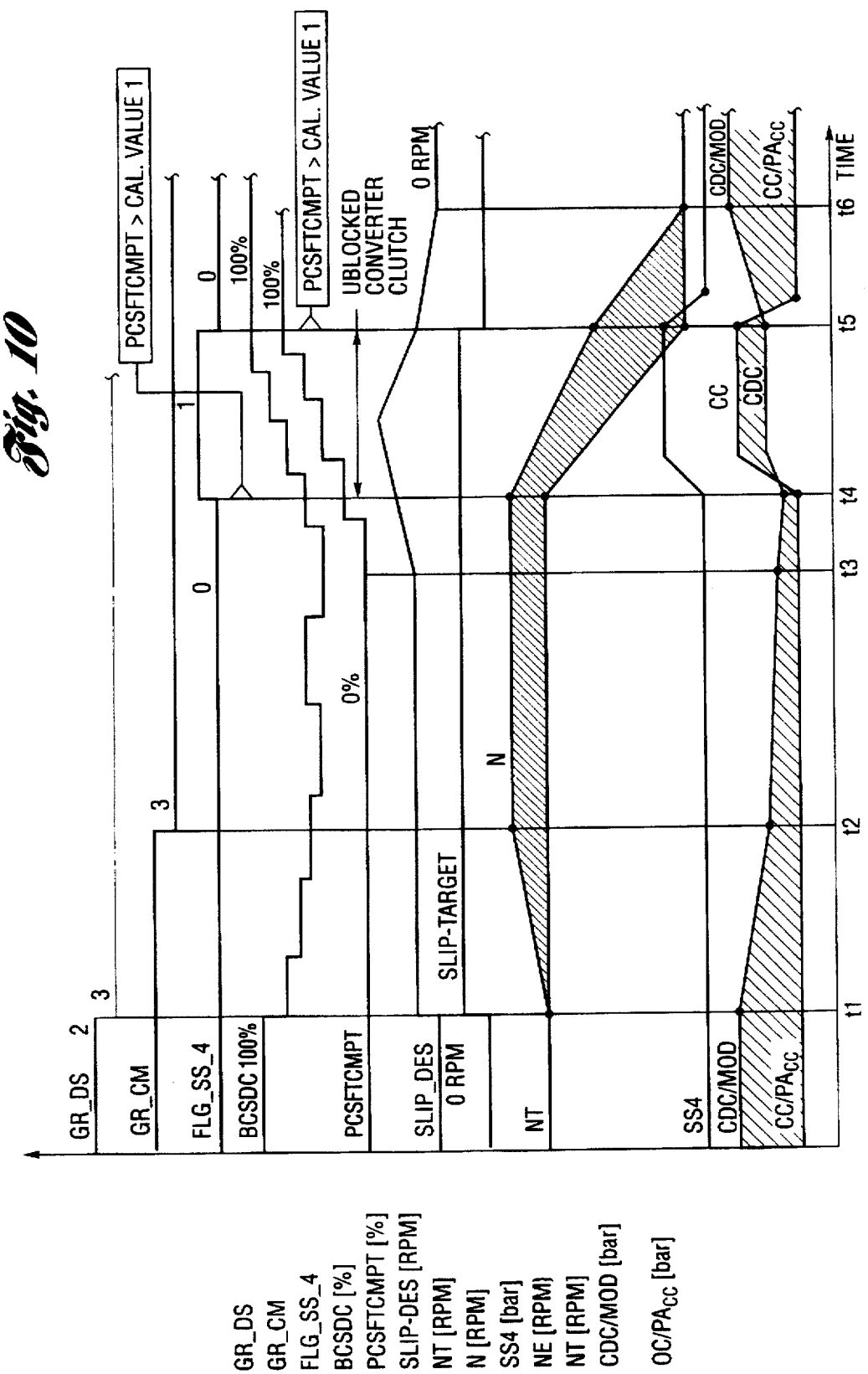
FIG. 10 shows a timing diagram for a converter clutch control during a 2-3 upshift with additional control of shift solenoid 4.

The timing diagram shown in FIG. 10 shows the converter clutch control for a 2-3 shift including the shift solenoid 4 (SS4) control part of the shift event. The control algorithms are the same up to the timing point t4, as described previously. When timing point t4 is reached, the control strategy is changed. This is described as follows:

t4:

Control Strategy (see FIGS. 9 and 10):

The percentage shift complete register PCSFTCMPT is greater than a calibratable value 1. At this point the shift solenoid flag FLG_SS_4 is set to 1. The PID controller is disabled and the system is in open loop control.

Control Hardware:

Shift solenoid 4 (SS4) is energized and moves the converter clutch control valve 98 into the downshift position. The converter clutch is physically unlocked. The CC/ACC pressure is changed to converter charge pressure (CC) applied on the back side of the converter clutch plate. The CDC/MOD pressure is changed to converter discharge pressure.

t5:

Control Strategy:

The percentage shift complete register PCSFTCMPT is greater than a calibratable value 2. At this point the shift solenoid flag FLG_SS_4 is set to 0. The PID controller is enabled and the system is back in closed loop control. The slip target value SLIP_TARGET is set to 0.

Control Hardware:

Shift solenoid 4 (SS4), seen at 16, is de-energized and the converter clutch control valve 98 moves into upshift position since PWM-pressure is still applied at the front of the converter clutch control valve. The converter clutch is physically locked. The CC pressure is changed to the converter accumulator pressure (CC/ACC) applied on the backside of the converter clutch plate. The CDC pressure is changed to converter apply pressure. The 2-3 upshift is completed and the converter clutch re-locks in closed loop control.

t6:

Control Strategy:

The PID-controller adjusts to zero rpm slip by increasing the duty cycle percentage (BCSDC).

Control Hardware:

The PWM-pressure is raised to a level where the converter clutch transmits full capacity. The converter clutch slip is zero rpm.

Figure 9:
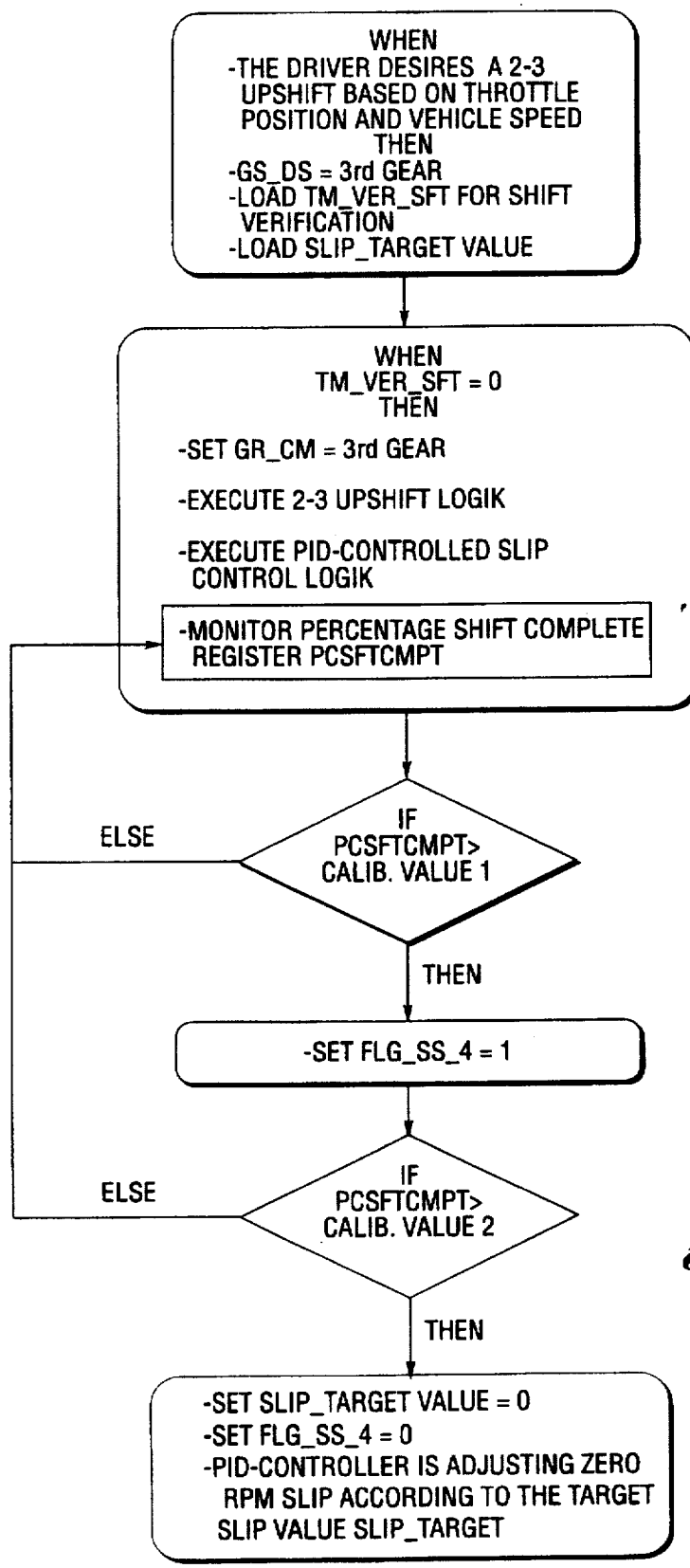
FIG. 9 shows the control logic in flow diagram form for the converter clutch control during a 2-3 upshift with additional control of shift solenoid 4.

The control strategy is shown in flow diagram form in FIG. 9.

SUMMARY

With the full electronically controlled converter clutch of this invention, a PWM-solenoid has been implemented which directly controls the converter clutch capacity. With closed loop and feedback control applied, continuous modulated clutch operation and clutch modulation over a shift is accomplished. It is possible to operate the converter clutch in each gear with a desired amount of slip and to synchronize desired slip values with the shifting event itself. This avoids the shift harshness that would be associated with a system that provides for shifting with a fully locked converter. A major advantage is an improvement gain in fuel economy which is made possible by applying the converter clutch in all gears. The converter losses during acceleration and deceleration of the vehicle are significantly reduced and a substantial performance gain is accomplished.

When the converter clutch is operated in a continuous slip mode, a damper-spring system can be eliminated. This represents a reduction in the manufacturing cost of the transmission. The converter clutch control system, furthermore, protects the modulation over the shift with the damper-spring system installed as well as a continuous slip operation without the damper-spring system.

Cooling and Thermostat Bypass Valve Control System

As shown in FIGS. 11b-a and 11b-b, the cooler flow is from an output port of the converter clutch control valve 98 in bore 200. From the converter clutch control valve the cooler flow is split into two components. One flow component, the COOLER flow, directly enters the cooler. The other flow component is the BYPASS LUBE flow, which is directed to the cooler limit valve 92 in bore 216. A downshifted cooler limit valve allows BYPASS LUBE flow to enter the lubrication circuit 155.

The thermostat bypass valve control 93 in bore 216 consists of the cooler limiting valve which is upshifted and downshifted by the thermostat bypass valve depending on the transmission oil temperature (TOT). The spring load FS2 holds the thermostat bypass valve in installed position. The spring load FS1 is installed on the back side of the cooler limit valve and acts against spring load FS2. In order to keep the thermostat bypass valve in installed position FS2 has to be higher than FS1.

The thermostat bypass valve displaces a pin installed in the valve itself, the displacement depending on transmission oil temperature (TOT). The higher the temperature, the higher the pin stroke. The following chart shows this characteristic:

| TOT (deg. °C.) | Pin Stroke (mm) |
| --- | --- |
| 66 | 0 |
| 73 | 1 |
| 74 | 2 |
| 76 | 2.5 |
| 77 | 3 |
| 78 | 4 |
| 80 | 5 |

When transmission oil temperature of about 80° C. has been reached, the pin stroke is at 4 mm and the cooler limiting valve closes the LUBE/BYPASS circuit (see the shadowed area of the above chart).

The cooler oil coming from the converter clutch control valve in bore 200 is directed entirely into the cooler. When the temperature is higher than 79° C., the purpose of the thermostat valve system is to provide lubrication oil during a cold start drive-away in case of a frozen cooler circuit. At temperatures lower than 66° C., the pin stroke is zero and the cooler limiting valve allows the bypass of cooler oil into the lubrication circuit. When higher temperatures have been reached, the pin stroke increases and the cooler limit valve closes the bypass. With this system, the transmission is always lubricated independently of a frozen cooler or low flow rates due to high viscosity. The pin stroke decreases when the transmission cools down, and the spring force FS1 pushes the pin back.

In case of a blocked cooler line within temperature ranges higher than 80° C., a differential area A1–A2 has been implemented at the cooler limiting valve. This differential area, in combination with the spring loads FS1 and FS2, provides a default mode in case the cooler lines are blocked. With increasing cooler pressure, the cooler limiting valve, including the thermostat bypass valve, is forced against the spring load FS2 to open the LUBE/BYPASS to the lubrication system. The pressure level for opening the bypass is determined as:

$$PC = (FS2 - FS1)/(A1 - A2)$$

This system provides emergency lubrication in case of a blocked transmission cooler line at higher transmission oil temperatures. Further, it inhibits a back pressure build up into the torque converter in case of a blocked cooler.

3. PWM Solenoid-Controlled Converter Clutch With a Converter Pressure Modulator Valve Disposed Between the PWM Solenoid and the Converter Clutch Control Valve In FIGS. 12a and 12b, we have shown an alternate torque converter clutch control system that includes a converter clutch control valve 320, an additional converter pressure modulator valve system 322, a modified converter clutch accumulator valve 324, and a solenoid regulator valve 326.

Figure 13:
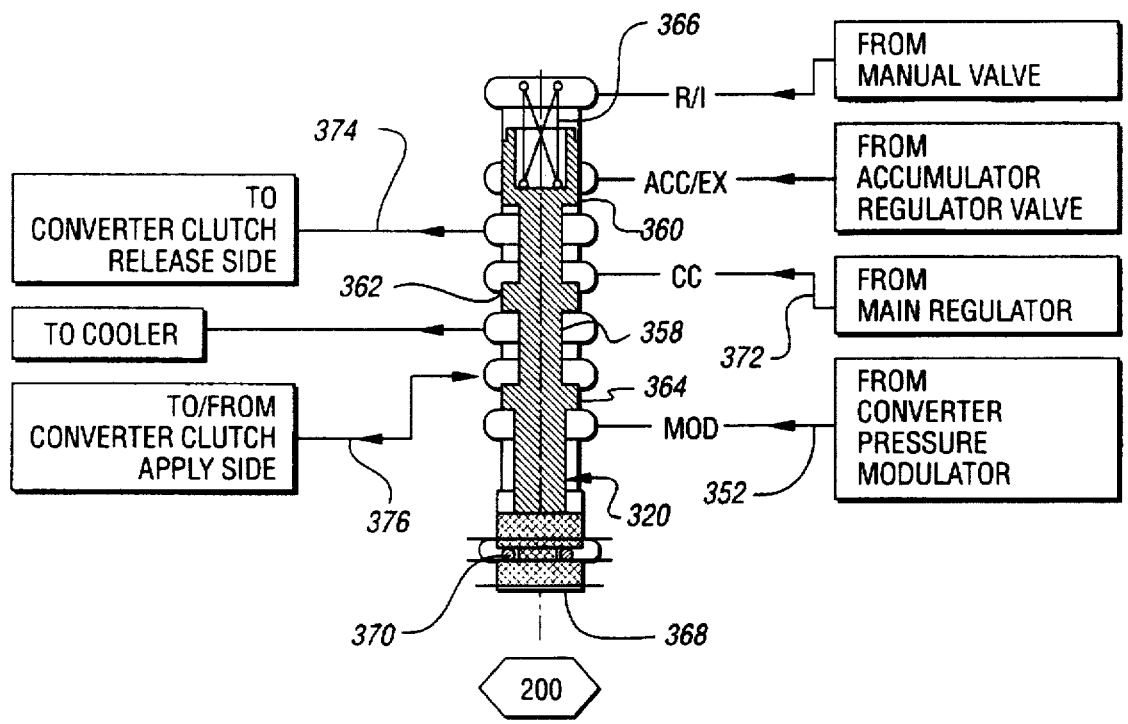
Figure 14:
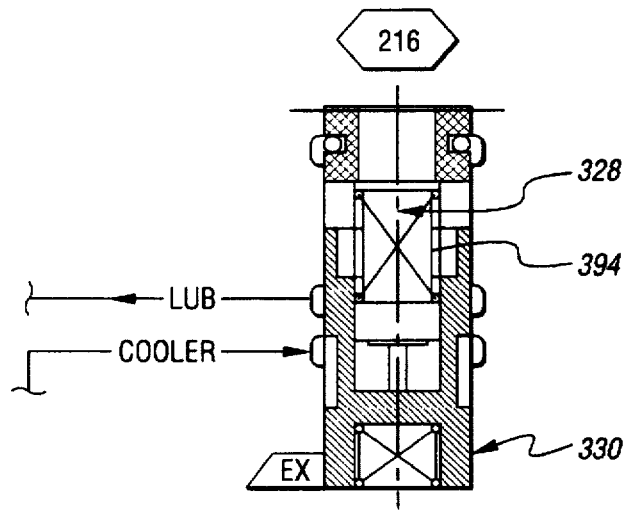

FIG. 13 shows the converter control valve 320 and the cooler limit valve at 330 in enlarged form. FIG. 14 shows a detailed view of the cooler limit valve.

Figure 16:
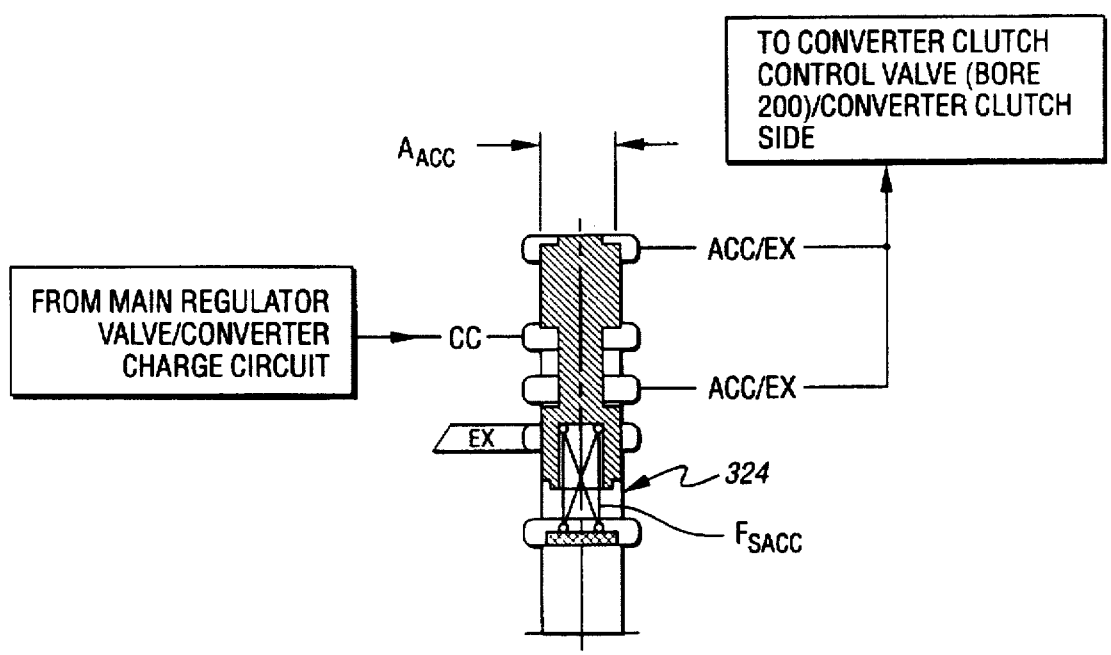
FIG. 16 is an enlarged view of the converter clutch accumulator valve which is part of the control valve circuit of FIG. 12b.

The converter clutch accumulator valve 324 is shown in enlarged form in FIG. 16. The converter pressure modulator valve system 322 is shown in enlarged form in FIG. 17. A pulse-width modulated solenoid valve 332 receives a PWM signal from the microcomputer controller 334 (uc) through signal lines 336. The pulse-width modulated valve 332 modulates SOL1 pressure in passage 338 and distributes a modulated pressure output through passage 340 to the converter pressure modulator valve 322. Line pressure in passage 342 is distributed to the converter pressure modulator valve system 322 from the manual valve 344. Passage 342 is pressurized when the manual valve is in the D, 3, 2 or 1 positions.

As indicated in FIG. 17, the valve system 322 comprises a valve spool having differential diameter lands and larger landing shown at 344 and the larger landing shown at 346. Valve spring 348 urges the valve spool in a downward direction. The upper end of the valve chamber in which the valve spool is disposed is exhausted, as shown at 350.

The modulated pressure output of the valve system 322 is distributed to passage 352, which extends to the converter control valve 320. The modulated pressure in passage 352 acts on the differential area of lands 344 and 346 to complement the force of the spring 348.

Pulse-width modulated pressure in passage 340 is distributed to a pilot valve 354, this valve is a single diameter valve, and acts on the lower end of the valve spool of the converter pressure modulator valve. The diameter of the pilot valve is less than the diameter of either land 344 or land 346.

Exhaust port 356 is located directly adjacent land 346 and the output pressure port is located directly adjacent land 344.

The conv erter control valve 320 comprises a valve spool 358 which has three lands 360, 362 and 364. Valve spool 358 is urged in a downward direction, as viewed in FIG. 13, by valve spring 366. When it is in the position shown in FIG. 13, valve spool 358 is seated on a valve plug 368 which is held in place by a wire retainer 370. Modulated pressure in passage 352 acts on the lower end of the valve spool to produce a force that oppose the force of the spring 366.

Converter charge pressure in passage 372 communicates with converter clutch pressure passage 374 through the space between valve lands 360 and 362, thereby pressurizing the converter clutch release side.

Passage 376 communicates with the apply side of the converter clutch. It is pressurized by converter charge pressure from the release side of the converter clutch when the converter control valve 320 is in the downward position in a manner similar to the previously described embodiments.

The line pressure developed by pump 380 communicates with the main regulator valve through passage 382. Regulated output pressure is distributed to passage 372. Cooler flow in passage 384 is established as communication takes place between passage 372 and passage 376, depending on whether the converter clutch control valve 320 is in the upward or downward position. Modulated converter clutch pressure is established as passage 352 communicates with the converter clutch control valve 320, thus moving the control valve to its upward position. This connects the output passage 352 of the converter clutch apply side 376 and establishes converter clutch capacity.

The output pressure of the converter clutch accumulator valve is distributed through passage 386, which communicates with the clutch release pressure in passage 374 through the space between lands 366 and 362. The pressure on the release side of the converter clutch is maintained at a constant value by the converter clutch accumulator valve 324 when the converter clutch is engaged. The input to the converter clutch accumulator valve is the converter charge pressure in passage 372. The feedback pressure path 388, together with the valve spring force of spring 390 and exhaust port 392, establishes a constant pressure in passage 386.

As in the case of the preceding embodiments, the converter clutch control valve spool is urged in a downward direction during reverse drive operation and during operation in manual low as selected by the manual valve.

Figure 15:
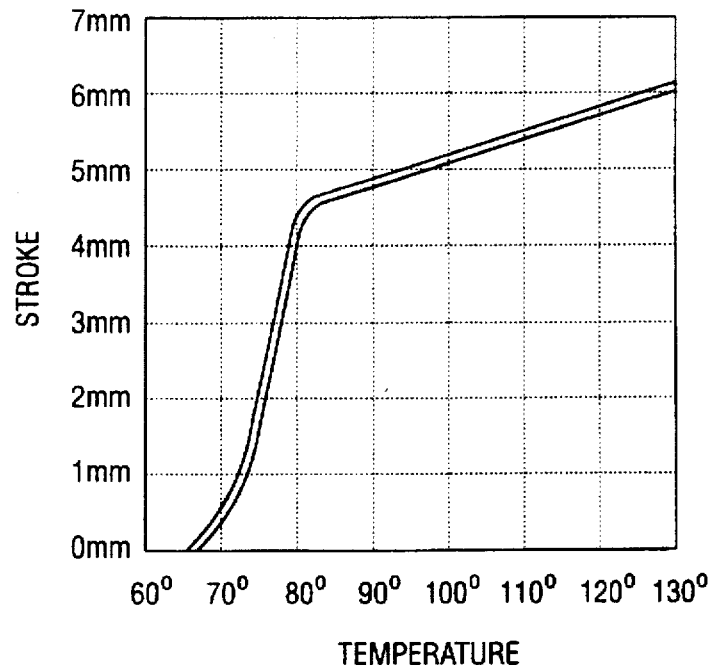
FIG. 15 is a plot of the thermostatic valve transfer function for the valve assembly of FIG. 14.

The thermostatic bypass valve and the cooler limit valve shown at 328 and 330 operate in a manner similar to the thermostatic bypass valve and cooler limit valve described previously. Thermostatic valve 328, however, includes an internal spring, shown at 394, rather than the external spring FS2 described with respect to the previous embodiment. The thermostatic valve transfer function for both the preceding embodiments and the embodiment of FIG. 14, however, are similar. This transfer function is plotted in FIG. 15.

The converter clutch accumulator valve is a pressure limiting valve with a feedback control. It is capable of maintaining a constant back pressure on the release side of the converter clutch regardless of a variable flow input. The ability to provide a constant back pressure with variable flow input enhances the converter clutch operation by achieving a constant back pressure on the clutch release side.

The converter pressure modulator valve system is capable of accommodating high leakage oil flow, including leakage flow, out of the converter clutch apply side when the transmission oil temperatures are elevated. It is capable of maintaining the necessary apply pressure on the converter clutch apply side when the converter is commanded to be unlocked.

The single diameter valve element 354 of the converter pressure modulator valve assembly makes it possible to calibrate the valve system for various engine applications without changing major hardware components (i.e., valve body machining) since it introduces a separate valve area that can be changed as desired for calibration purposes. The valve 354 thus acts as a pilot valve for the modulator valve.

Figure 18:
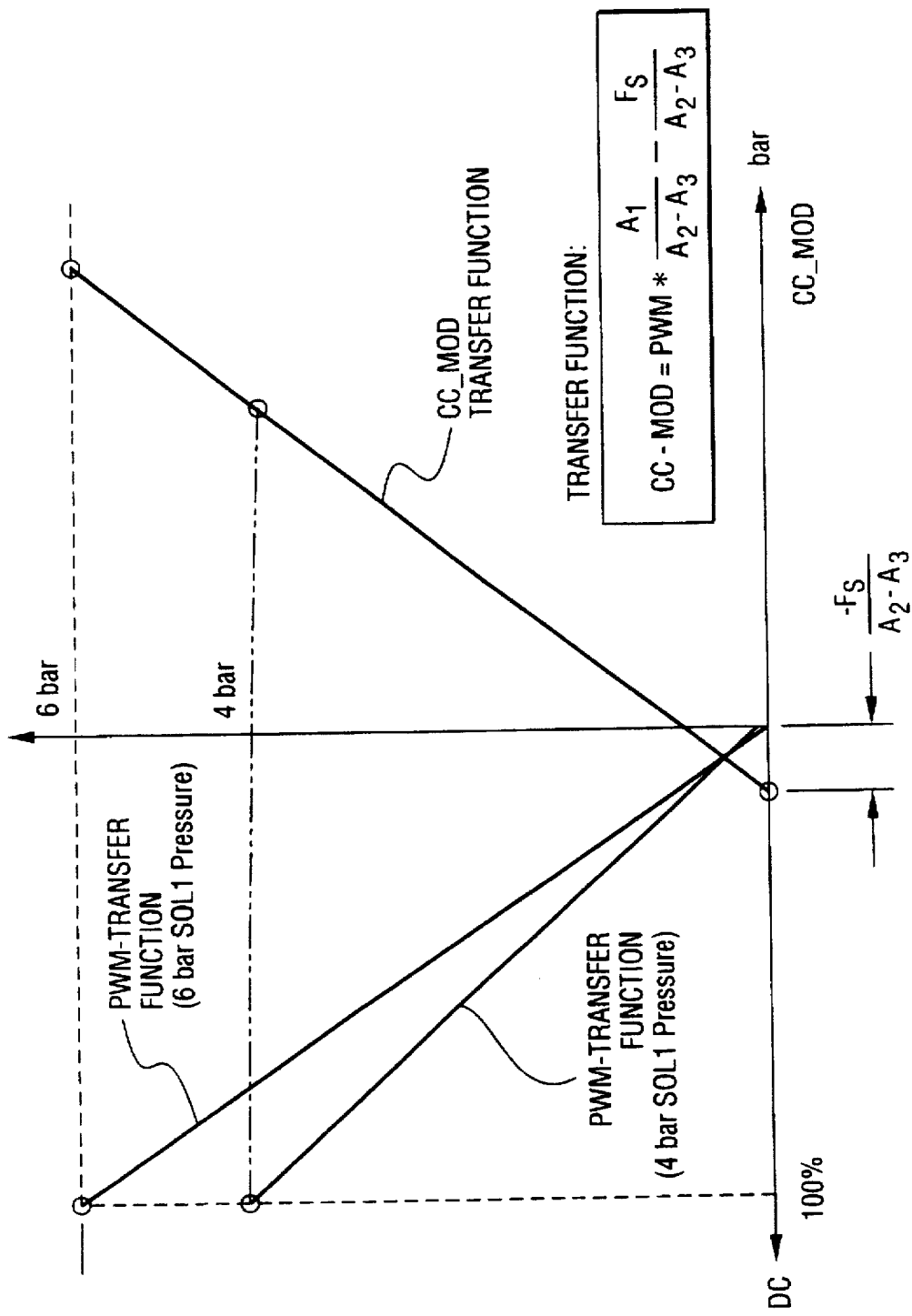
FIG. 18 is a plot of the converter pressure modulator valve system characteristics showing the relationship between pulse-width modulated pressure developed by valve 332 and both duty cycle and converter clutch modulator pressure.

FIG. 18 shows the converter clutch modulated pressure transfer function in a plot of PWM pressure against converter clutch modulated pressure. The converter clutch modulator pressure transfer function acts an amplifier for the PWM pressure developed by the PWM solenoid valve 332. The left-hand side of the plot of FIG. 18 shows the PWM pressure transfer function with respect to the duty cycle of the PWM solenoid valve 332. It is plotted with two different input pressures; i.e., six bar maximum and four bar minimum. The relationship of PWM pressure versus converter clutch modulator pressure is shown in the transfer function plotted in FIG. 18.

The slopes of the pressures plotted in FIG. 18 can be changed by changing a pilot valve diameter and by changing the spring load to adapt the system for various engine applications. The control strategy known as a torque feedforward system, which is illustrated in FIG. 5d, can be calibrated to accommodate the modification illustrated in FIG. 12. The structure of the state model control block called "inverse valve model" can be adjusted in accordance with the slopes of the plots shown in FIG. 18. The control block of FIG. 5d that is called "inverse PWM model" can be adjusted according to the maximum six bar input pressure described with reference to FIG. 12.

Having described preferred embodiments of the invention, what we claim and desire to secure by U.S. Letters Patent is:

1. An automatic control for a hydrokinetic, multiple ratio transmission for delivering torque from an engine to a driven member comprising a hydrokinetic torque converter and multiple ratio gearing, said torque converter having an impeller driven by said engine and a turbine connected to a torque input element of said gearing, a torque output portion of said gearing being connected to said driven member;

said transmission including fluid pressure-operated clutch and brake means for establishing and disestablishing torque ratio changes in said gearing;

a pressure source, a control valve system connecting said pressure source to said clutch and brake means;

a pressure-operated torque converter torque bypass clutch in said converter, said bypass clutch establishing a friction torque flow path between said turbine and said impeller when it is engaged, said bypass clutch comprising a clutch piston in said converter and defining in said converter a bypass clutch release pressure chamber and a bypass clutch apply pressure chamber;

said clutch piston being engaged with a torque transmitting capacity that is dependent upon pressure differential across said clutch piston;

a bypass clutch apply pressure passage communicating with said converter, a bypass clutch release pressure passage communicating with said release pressure chamber;

main pressure regulator valve means in said valve system for regulating control pressure in said valve system;

accumulator valve means in said valve system communicating with said main pressure regulator valve means for establishing an accumulator threshold pressure in said release chamber;

a converter fluid cooler and transmission lubrication circuit including converter cooler and lubrication portions;

converter clutch control valve means, movable between first and second positions, communicating with said release pressure passage for delivering pressure in said release pressure passage to said cooler and lubrication circuit when it assumes said first position;

a converter pressure modulator valve means communicating with said main pressure regulator valve means for modulating said control pressure to produce a converter clutch apply pressure in said bypass clutch apply pressure passage communicating with a converter pressure solenoid valve means when said converter clutch control valve means assumes said second position for varying pressure differential across said clutch piston;

said converter pressure solenoid valve means in said valve system communicating with said modulator valve means for establishing a pilot pressure on said modulator valve means; and electronic control means responsive to operating variables for energizing said solenoid valve means whereby said bypass clutch capacity is controlled to effect smooth engagement and release.

2. The automatic control set forth in claim 1 wherein said operating variables include engine speed, turbine speed and vehicle speed, said solenoid control means responding to said variables to effect a controlled reduction in bypass clutch capacity during changes in ratio in said gearing.

3. The automatic control set forth in claim 1 wherein said valve system includes a converter clutch accumulator valve means communicating with said main pressure regulator valve means for establishing a constant converter clutch release pressure, said converter clutch accumulator valve communicating with said bypass clutch pressure release chamber through said converter clutch control valve means.

4. The automatic control set forth in claim 2 wherein said valve system includes a converter clutch accumulator valve means communicating with said main pressure regulator valve means for establishing a constant converter clutch release pressure, said converter clutch accumulator valve communicating with said bypass clutch pressure release chamber through said converter clutch control valve means.

* * * * *